US009606992B2

(12) United States Patent
Geisner et al.

(10) Patent No.: US 9,606,992 B2
(45) Date of Patent: Mar. 28, 2017

(54) PERSONAL AUDIO/VISUAL APPARATUS PROVIDING RESOURCE MANAGEMENT

(75) Inventors: Kevin A. Geisner, Mercer Island, WA (US); Kathryn Stone Perez, Kirkland, WA (US); Stephen G. Latta, Seattle, WA (US); Ben J. Sugden, Woodinville, WA (US); Benjamin I. Vaught, Seattle, WA (US); Alex Aben-Athar Kipman, Redmond, WA (US); Jeffrey A. Kohler, Redmond, WA (US); Daniel J. McCulloch, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1006 days.

(21) Appl. No.: 13/535,074

(22) Filed: Jun. 27, 2012

(65) Prior Publication Data

US 2013/0083064 A1    Apr. 4, 2013

Related U.S. Application Data

(63) Continuation-in-part of application No. 13/250,878, filed on Sep. 30, 2011, now abandoned, and a
(Continued)

(51) Int. Cl.
*G09G 5/00*   (2006.01)
*G06F 17/30*   (2006.01)
(Continued)

(52) U.S. Cl.
CPC ........ *G06F 17/30047* (2013.01); *G06F 3/011* (2013.01); *G09G 3/003* (2013.01);
(Continued)

(58) Field of Classification Search
CPC ....... G06T 19/006; G06T 19/00; G06T 17/00; G06T 15/00; G06F 3/011; G06F 3/012;
(Continued)

(56) References Cited

U.S. PATENT DOCUMENTS 5,333,874 A    8/1994 Arnold et al.
5,401,026 A    3/1995 Eccher et al.
(Continued)

FOREIGN PATENT DOCUMENTS

EP    1435737 A1    7/2004

OTHER PUBLICATIONS

Response to Office Action filed Oct. 18, 2013 in U.S. Appl. No. 13/250,878, 9 pages.
(Continued)

*Primary Examiner* — Devona Faulk
*Assistant Examiner* — Charles L Beard
(74) *Attorney, Agent, or Firm* — Vierra Magen Marcus LLP

(57) ABSTRACT

Technology is described for resource management based on data including image data of a resource captured by at least one capture device of at least one personal audiovisual (A/V) apparatus including a near-eye, augmented reality (AR) display. A resource is automatically identified from image data captured by at least one capture device of at least one personal A/V apparatus and object reference data. A location in which the resource is situated and a 3D space position or volume of the resource in the location is tracked. A property of the resource is also determined from the image data and tracked. A function of a resource may also be stored for determining whether the resource is usable for a task. Responsive to notification criteria for the resource being satisfied, image data related to the resource is displayed on the near-eye AR display.

20 Claims, 14 Drawing Sheets

Related U.S. Application Data continuation-in-part of application No. 13/436,526, filed on Mar. 30, 2012, now Pat. No. 9,053,483.

(51) Int. Cl.
  *G09G 3/00* (2006.01)
  *G06F 3/01* (2006.01)
  *G09G 5/12* (2006.01)

(52) U.S. Cl.
  CPC ........... *G09G 5/12* (2013.01); *G09G 2340/12* (2013.01); *G09G 2380/00* (2013.01)

(58) Field of Classification Search
  CPC .. G06F 3/0484; G06F 3/167; G06F 17/30047; G02B 27/017; G06Q 20/20; G06Q 20/204; G06Q 30/00; G06Q 30/06; G06Q 30/0601; G06Q 30/0603; G06Q 20/208; G06Q 30/0641; G06Q 30/0643; G06Q 10/08; G06Q 10/083; G06Q 10/0833; G06Q 10/0835; G06Q 10/087; G06Q 10/0875; G06Q 30/02; H04L 67/12; H04L 67/22; H04L 67/18; H04L 12/66; H04W 4/20; H04W 4/02; H04W 4/028; G01S 5/14; G01S 11/06; G09G 5/18; G09G 5/377; G09G 238/00; G09G 3/003; G09G 2380/00; G09G 5/12; A63F 13/10; A63F 2300/538; A63F 2300/695; A63F 2300/8094; A63F 13/12; A63F 2300/5573; A63F 2300/6018; A63F 2300/1093; H04M 1/72544; H04M 2250/52; H04N 21/6582; H04N 21/4223
  See application file for complete search history.

(56) References Cited

U.S. PATENT DOCUMENTS

| | | | |
|---|---|---|---|
| 5,692,115 A * | 11/1997 | Itoh et al. | 345/427 |
| 5,728,006 A | 3/1998 | Teitell et al. | |
| 5,762,561 A | 6/1998 | Zine | |
| 5,826,578 A | 10/1998 | Curchod | |
| 5,826,874 A | 10/1998 | Teitell et al. | |
| 5,869,819 A * | 2/1999 | Knowles | G06Q 10/08 235/375 |
| 5,920,261 A * | 7/1999 | Hughes | G01S 13/878 340/3.51 |
| 6,091,546 A * | 7/2000 | Spitzer | 359/618 |
| 6,217,444 B1 | 4/2001 | Kataoka et al. | |
| 6,224,387 B1 | 5/2001 | Jones | |
| 6,351,261 B1 * | 2/2002 | Reichlen | G06F 3/011 345/427 |
| 6,396,497 B1 * | 5/2002 | Reichlen | 345/427 |
| 6,517,353 B1 | 2/2003 | Jones | |
| 6,567,536 B2 | 5/2003 | McNitt et al. | |
| 6,623,370 B1 | 9/2003 | Willer | |
| 6,663,498 B2 | 12/2003 | Stipan | |
| 6,767,282 B2 | 7/2004 | Matsuyama et al. | |
| RE38,668 E * | 12/2004 | Edwards | 600/558 |
| 7,197,165 B2 * | 3/2007 | Ryan | 382/103 |
| 7,458,894 B2 | 12/2008 | Danieli et al. | |
| 7,564,469 B2 * | 7/2009 | Cohen | 345/632 |
| 7,575,163 B2 * | 8/2009 | Malik | 235/383 |
| 7,657,079 B2 * | 2/2010 | Lake et al. | 382/154 |
| 7,671,916 B2 | 3/2010 | Hashimoto | |
| 7,693,702 B1 | 4/2010 | Kerner et al. | |
| 7,724,250 B2 * | 5/2010 | Ishii et al. | 345/419 |
| 7,744,482 B1 | 6/2010 | Watson | |
| 7,797,204 B2 * | 9/2010 | Balent | G06Q 10/087 705/26.8 |
| 7,815,516 B1 | 10/2010 | Mortimer et al. | |
| 7,817,104 B2 | 10/2010 | Ryu et al. | |
| 7,823,778 B1 * | 11/2010 | Singh et al. | 235/385 |
| 7,834,909 B2 * | 11/2010 | Katano | G06F 3/012 345/629 |
| 7,868,904 B2 * | 1/2011 | Morita | G06T 19/006 345/629 |
| 7,922,586 B2 | 4/2011 | Heckendorf, III et al. | |
| 7,965,304 B2 * | 6/2011 | Sakagawa | G06T 15/60 345/426 |
| 8,032,409 B1 * | 10/2011 | Mikurak | 705/14.39 |
| 8,098,263 B2 * | 1/2012 | Noro et al. | 345/619 |
| 8,185,132 B1 * | 5/2012 | Katpelly et al. | 455/456.1 |
| 8,217,856 B1 * | 7/2012 | Petrou | 345/8 |
| 8,223,088 B1 * | 7/2012 | Gomez et al. | 345/7 |
| 8,323,106 B2 * | 12/2012 | Zalewski | 463/31 |
| 8,325,984 B2 * | 12/2012 | Lee et al. | 382/103 |
| 8,432,489 B2 | 4/2013 | Arseneau et al. | |
| 8,488,246 B2 * | 7/2013 | Border et al. | 359/630 |
| 8,558,759 B1 * | 10/2013 | Prada Gomez et al. | 345/7 |
| 8,788,952 B2 * | 7/2014 | Hamilton, II et al. | 715/757 |
| 8,880,397 B2 * | 11/2014 | Almaer et al. | 704/235 |
| 8,884,988 B1 * | 11/2014 | Cho | G06T 19/006 345/633 |
| 8,913,085 B2 * | 12/2014 | Anderson et al. | 345/633 |
| 9,042,596 B2 * | 5/2015 | Connor | G06K 9/00771 348/158 |
| 9,052,804 B1 * | 6/2015 | Starner | G06F 1/163 |
| 9,254,099 B2 * | 2/2016 | Connor | A61B 5/1114 |
| 9,442,100 B2 * | 9/2016 | Connor | G01N 33/02 |
| 2002/0041327 A1 * | 4/2002 | Hildreth | G06F 3/011 348/42 |
| 2002/0138582 A1 * | 9/2002 | Chandra et al. | 709/206 |
| 2003/0103670 A1 * | 6/2003 | Schoelkopf et al. | 382/162 |
| 2003/0131152 A1 * | 7/2003 | Erlingsson | 709/328 |
| 2004/0109009 A1 * | 6/2004 | Yonezawa | G06T 19/006 345/632 |
| 2004/0113885 A1 * | 6/2004 | Genc et al. | 345/156 |
| 2004/0119662 A1 * | 6/2004 | Dempski | 345/8 |
| 2004/0174386 A1 * | 9/2004 | Kotake et al. | 345/633 |
| 2005/0024388 A1 * | 2/2005 | Takemoto | 345/633 |
| 2005/0113649 A1 | 5/2005 | Bergantino | |
| 2005/0139662 A1 * | 6/2005 | Eglen | G06Q 30/06 235/383 |
| 2005/0172264 A1 * | 8/2005 | Yuknewicz | G06F 8/38 717/113 |
| 2005/0179617 A1 * | 8/2005 | Matsui et al. | 345/7 |
| 2005/0209934 A1 * | 9/2005 | Irby | G06Q 10/087 705/28 |
| 2005/0227791 A1 | 10/2005 | McCreary et al. | |
| 2005/0275636 A1 * | 12/2005 | Dehlin et al. | 345/173 |
| 2005/0275914 A1 * | 12/2005 | Vesely | G02B 27/2221 359/13 |
| 2006/0038833 A1 | 2/2006 | Mallinson et al. | |
| 2006/0152434 A1 * | 7/2006 | Sauer et al. | 345/8 |
| 2006/0230123 A1 | 10/2006 | Simmons et al. | |
| 2006/0244820 A1 * | 11/2006 | Morita et al. | 348/14.13 |
| 2007/0035563 A1 | 2/2007 | Biocca et al. | |
| 2007/0088746 A1 | 4/2007 | Baker | |
| 2007/0238981 A1 * | 10/2007 | Zhu et al. | 600/424 |
| 2007/0273644 A1 * | 11/2007 | Mondine Natucci | 345/156 |
| 2007/0276721 A1 * | 11/2007 | Jackson | 705/10 |
| 2008/0018667 A1 | 1/2008 | Cheng | |
| 2008/0073430 A1 | 3/2008 | Sickenius | |
| 2008/0082465 A1 | 4/2008 | Meijer et al. | |
| 2008/0147325 A1 | 6/2008 | Maassel et al. | |
| 2008/0204450 A1 | 8/2008 | Dawson et al. | |
| 2008/0259096 A1 | 10/2008 | Huston | |
| 2008/0306946 A1 * | 12/2008 | Wu | G06Q 30/02 |
| 2009/0066690 A1 * | 3/2009 | Harrison | 345/419 |
| 2009/0111670 A1 * | 4/2009 | Williams | A63B 23/0464 482/146 |
| 2009/0112359 A1 * | 4/2009 | Sanguinetti | 700/228 |
| 2009/0144081 A1 | 6/2009 | Harlan | |
| 2009/0154293 A1 | 6/2009 | Sengupta et al. | |
| 2009/0167787 A1 * | 7/2009 | Bathiche et al. | 345/633 |
| 2009/0182499 A1 * | 7/2009 | Bravo | 701/207 |
| 2009/0189974 A1 | 7/2009 | Deering | |
| 2009/0238378 A1 * | 9/2009 | Kikinis et al. | 381/92 |
| 2009/0240767 A1 * | 9/2009 | Zhang | 709/203 |
| 2009/0244097 A1 * | 10/2009 | Estevez | 345/633 |

(56) References Cited

U.S. PATENT DOCUMENTS

| | | | | |
|---|---|---|---|---|
| 2009/0254361 A1* | | 10/2009 | Schoenberg | 705/2 |
| 2009/0262113 A1* | | 10/2009 | Kotake et al. | 345/427 |
| 2009/0262946 A1 | | 10/2009 | Dunko | |
| 2009/0265381 A1 | | 10/2009 | Canu et al. | |
| 2009/0279784 A1* | | 11/2009 | Arcas et al. | 382/190 |
| 2009/0293012 A1* | | 11/2009 | Alter et al. | 715/810 |
| 2009/0310851 A1* | | 12/2009 | Arcas et al. | 382/154 |
| 2010/0009700 A1* | | 1/2010 | Camp et al. | 455/456.6 |
| 2010/0010902 A1* | | 1/2010 | Casey | 705/17 |
| 2010/0030578 A1 | | 2/2010 | Siddique et al. | |
| 2010/0045701 A1 | | 2/2010 | Scott et al. | |
| 2010/0091096 A1* | | 4/2010 | Oikawa et al. | 348/53 |
| 2010/0103196 A1* | | 4/2010 | Kumar et al. | 345/633 |
| 2010/0111387 A1 | | 5/2010 | Christiansen, II et al. | |
| 2010/0146402 A1* | | 6/2010 | Hamilton, II | G06Q 10/04 715/751 |
| 2010/0158310 A1* | | 6/2010 | McQueen et al. | 382/100 |
| 2010/0164990 A1 | | 7/2010 | Van Doorn | |
| 2010/0169837 A1* | | 7/2010 | Hyndman | 715/848 |
| 2010/0171758 A1 | | 7/2010 | Maassel et al. | |
| 2010/0199232 A1 | | 8/2010 | Mistry et al. | |
| 2010/0205667 A1* | | 8/2010 | Anderson et al. | 726/19 |
| 2010/0208033 A1 | | 8/2010 | Edge et al. | |
| 2010/0238161 A1* | | 9/2010 | Varga et al. | 345/419 |
| 2010/0241525 A1* | | 9/2010 | Aguera y Arcas | G06F 3/011 705/26.1 |
| 2010/0248689 A1* | | 9/2010 | Teng et al. | 455/411 |
| 2010/0257071 A1* | | 10/2010 | Bokor et al. | 705/28 |
| 2010/0257252 A1 | | 10/2010 | Dougherty et al. | |
| 2010/0262513 A1* | | 10/2010 | Bonner | G01S 5/14 705/26.1 |
| 2010/0302499 A1* | | 12/2010 | Watanabe | 349/201 |
| 2010/0328344 A1* | | 12/2010 | Mattila et al. | 345/633 |
| 2011/0052083 A1* | | 3/2011 | Rekimoto | 382/218 |
| 2011/0065496 A1 | | 3/2011 | Gagner et al. | |
| 2011/0081048 A1* | | 4/2011 | Woo et al. | 382/103 |
| 2011/0098109 A1 | | 4/2011 | Leake et al. | |
| 2011/0107429 A1* | | 5/2011 | Marilly et al. | 726/26 |
| 2011/0112904 A1 | | 5/2011 | Stupp | |
| 2011/0119640 A1 | | 5/2011 | Berkes et al. | |
| 2011/0125614 A1* | | 5/2011 | Dollens | 705/27.2 |
| 2011/0140994 A1* | | 6/2011 | Noma | 345/8 |
| 2011/0151955 A1 | | 6/2011 | Nave | |
| 2011/0175932 A1* | | 7/2011 | Yu et al. | 345/661 |
| 2011/0187744 A1 | | 8/2011 | Kim et al. | |
| 2011/0187746 A1* | | 8/2011 | Suto et al. | 345/634 |
| 2011/0202401 A1* | | 8/2011 | Magadi et al. | 705/14.25 |
| 2011/0213664 A1* | | 9/2011 | Osterhout et al. | 705/14.58 |
| 2011/0216002 A1* | | 9/2011 | Weising | G09G 5/08 345/158 |
| 2011/0218839 A1 | | 9/2011 | Shamaiengar | |
| 2011/0221656 A1* | | 9/2011 | Haddick | G02B 27/017 345/8 |
| 2011/0221672 A1* | | 9/2011 | Osterhout et al. | 345/156 |
| 2011/0221793 A1 | | 9/2011 | King, III et al. | |
| 2011/0227812 A1* | | 9/2011 | Haddick et al. | 345/8 |
| 2011/0227820 A1* | | 9/2011 | Haddick et al. | 345/156 |
| 2011/0234386 A1* | | 9/2011 | Matsuda | 340/12.54 |
| 2011/0234879 A1* | | 9/2011 | Kashitani | 348/333.02 |
| 2011/0237331 A1 | | 9/2011 | Doucet et al. | |
| 2011/0242090 A1* | | 10/2011 | Keating | G06T 19/006 345/419 |
| 2011/0246064 A1* | | 10/2011 | Nicholson | 701/206 |
| 2011/0246284 A1* | | 10/2011 | Chaikin et al. | 705/14.38 |
| 2011/0254861 A1* | | 10/2011 | Emura et al. | 345/633 |
| 2011/0270135 A1* | | 11/2011 | Dooley | A61B 5/1121 600/595 |
| 2011/0283223 A1* | | 11/2011 | Vaittinen et al. | 715/781 |
| 2011/0301927 A1 | | 12/2011 | Ok | |
| 2011/0318717 A1* | | 12/2011 | Adamowicz | G09B 19/0092 434/127 |
| 2012/0001901 A1* | | 1/2012 | Park | 345/419 |
| 2012/0005222 A1 | | 1/2012 | Bhagwan et al. | |
| 2012/0023166 A1* | | 1/2012 | Kim et al. | 709/204 |
| 2012/0038670 A1* | | 2/2012 | Choi et al. | 345/633 |
| 2012/0044263 A1* | | 2/2012 | Kim et al. | 345/633 |
| 2012/0047233 A1* | | 2/2012 | Jin | 709/219 |
| 2012/0057032 A1* | | 3/2012 | Jang et al. | 348/207.1 |
| 2012/0057778 A1* | | 3/2012 | Fukazawa et al. | 382/154 |
| 2012/0062445 A1 | | 3/2012 | Haddick et al. | |
| 2012/0068913 A1* | | 3/2012 | Bar-Zeev et al. | 345/8 |
| 2012/0072302 A1 | | 3/2012 | Chen et al. | |
| 2012/0081393 A1* | | 4/2012 | Kim | 345/633 |
| 2012/0081529 A1* | | 4/2012 | Seo | 348/61 |
| 2012/0086727 A1* | | 4/2012 | Korah et al. | 345/633 |
| 2012/0092369 A1* | | 4/2012 | Kim et al. | 345/633 |
| 2012/0092372 A1* | | 4/2012 | Ryu et al. | 345/633 |
| 2012/0092528 A1* | | 4/2012 | Jung et al. | 348/239 |
| 2012/0093369 A1* | | 4/2012 | Ryu | 382/103 |
| 2012/0098859 A1* | | 4/2012 | Lee et al. | 345/633 |
| 2012/0105581 A1* | | 5/2012 | Berestov et al. | 348/43 |
| 2012/0113138 A1* | | 5/2012 | Uusitalo et al. | 345/629 |
| 2012/0127062 A1* | | 5/2012 | Bar-Zeev et al. | 345/6 |
| 2012/0139906 A1* | | 6/2012 | Zhang et al. | 345/419 |
| 2012/0203799 A1* | | 8/2012 | Blanchflower et al. | 707/784 |
| 2012/0206452 A1* | | 8/2012 | Geisner | G02B 27/017 345/419 |
| 2012/0208456 A1* | | 8/2012 | Hill | 455/41.1 |
| 2012/0218296 A1* | | 8/2012 | Belimpasakis et al. | 345/633 |
| 2012/0218298 A1* | | 8/2012 | Hayakawa | G06F 3/011 345/633 |
| 2012/0223813 A1* | | 9/2012 | Baxter et al. | 340/10.1 |
| 2012/0224743 A1* | | 9/2012 | Rodriguez et al. | 382/103 |
| 2012/0233002 A1 | | 9/2012 | Abujbara | |
| 2012/0250940 A1* | | 10/2012 | Kasahara | 382/103 |
| 2012/0290401 A1* | | 11/2012 | Neven | 705/14.68 |
| 2012/0290591 A1* | | 11/2012 | Flynn | G06F 17/30247 707/754 |
| 2012/0293773 A1* | | 11/2012 | Publicover et al. | 351/210 |
| 2012/0306850 A1* | | 12/2012 | Balan et al. | 345/419 |
| 2012/0323589 A1* | | 12/2012 | Udani | 705/2 |
| 2012/0327116 A1* | | 12/2012 | Liu et al. | 345/633 |
| 2013/0002724 A1* | | 1/2013 | Heinrich et al. | 345/676 |
| 2013/0031511 A1* | | 1/2013 | Adachi | G06F 9/4443 715/825 |
| 2013/0050258 A1* | | 2/2013 | Liu et al. | 345/633 |
| 2013/0050432 A1* | | 2/2013 | Perez et al. | 348/47 |
| 2013/0050642 A1* | | 2/2013 | Lewis et al. | 351/204 |
| 2013/0050833 A1* | | 2/2013 | Lewis et al. | 359/630 |
| 2013/0051611 A1* | | 2/2013 | Hicks | 382/103 |
| 2013/0083003 A1* | | 4/2013 | Perez | G06F 3/005 345/419 |
| 2013/0085345 A1* | | 4/2013 | Geisner | G06Q 30/00 600/300 |
| 2013/0107038 A1* | | 5/2013 | Ota et al. | 348/135 |
| 2013/0162688 A1* | | 6/2013 | Matsuoka | H04N 9/3188 345/682 |
| 2013/0171304 A1* | | 7/2013 | Huntley | G06Q 50/00 426/231 |
| 2013/0326364 A1* | | 12/2013 | Latta | G06F 3/012 715/751 |
| 2013/0328925 A1* | | 12/2013 | Latta | G09G 3/003 345/633 |
| 2014/0028712 A1* | | 1/2014 | Keating | G06T 19/006 345/633 |
| 2014/0098379 A1* | | 4/2014 | Smits | G01B 11/14 356/614 |
| 2014/0147829 A1* | | 5/2014 | Jerauld | G06F 1/163 434/430 |
| 2014/0252091 A1* | | 9/2014 | Morse | F25D 29/00 235/385 |
| 2014/0275850 A1* | | 9/2014 | Venkatraman | A61B 5/0002 600/301 |
| 2014/0278229 A1* | | 9/2014 | Hong | A61B 5/7455 702/160 |
| 2014/0288435 A1* | | 9/2014 | Richards | A61B 5/02427 600/479 |
| 2014/0333612 A1* | | 11/2014 | Itoh | G09G 3/003 345/419 |
| 2014/0375683 A1* | | 12/2014 | Salter | G06F 3/013 345/633 |

(56) References Cited

U.S. PATENT DOCUMENTS

| | | | | |
|---|---|---|---|---|
| 2015/0077434 | A1* | 3/2015 | Fukuchi | G06F 3/011 345/633 |
| 2015/0148623 | A1* | 5/2015 | Benaron | A61B 5/0059 600/306 |
| 2015/0168365 | A1* | 6/2015 | Connor | G01N 33/02 356/51 |
| 2015/0170256 | A1* | 6/2015 | Pettyjohn | G06Q 30/0639 705/14.49 |
| 2015/0230735 | A1* | 8/2015 | Venkatraman | A61B 5/1112 600/301 |
| 2015/0264338 | A1* | 9/2015 | Ueno | G06F 1/163 345/173 |
| 2015/0313539 | A1* | 11/2015 | Connor | A61B 90/00 600/544 |
| 2015/0324698 | A1* | 11/2015 | Karaoguz | G06F 19/3437 706/46 |
| 2016/0012749 | A1* | 1/2016 | Connor | G09B 5/00 600/13 |
| 2016/0026253 | A1* | 1/2016 | Bradski | G02B 27/225 345/8 |
| 2016/0034764 | A1* | 2/2016 | Connor | G06K 9/00771 348/158 |
| 2016/0035248 | A1* | 2/2016 | Gibbs | G06T 7/0002 434/127 |
| 2016/0048230 | A1* | 2/2016 | Shimoda | H04N 13/004 345/633 |
| 2016/0073886 | A1* | 3/2016 | Connor | G09B 19/0092 600/475 |
| 2016/0084869 | A1* | 3/2016 | Yuen | G01P 7/00 73/510 |
| 2016/0112684 | A1* | 4/2016 | Connor | G01N 33/02 348/158 |
| 2016/0123657 | A1* | 5/2016 | Kim | F25D 29/00 62/125 |
| 2016/0125167 | A1* | 5/2016 | Hasegawa | G06Q 50/24 705/2 |
| 2016/0138860 | A1* | 5/2016 | Kang | F25D 29/00 62/130 |
| 2016/0138962 | A1* | 5/2016 | Cartwright | G01G 19/4144 177/1 |
| 2016/0140870 | A1* | 5/2016 | Connor | G09B 19/0092 356/51 |
| 2016/0143582 | A1* | 5/2016 | Connor | A61B 5/4866 600/301 |
| 2016/0184703 | A1* | 6/2016 | Brav | A63F 13/213 463/30 |
| 2016/0223250 | A1* | 8/2016 | Kang | F25D 29/00 |

OTHER PUBLICATIONS

Final Office Action dated Feb. 4, 2014 in U.S. Appl. No. 13/250,878, 43 pages.
Response to Office Action filed May 2, 2014, in U.S. Appl. No. 13/250,878, 10 pages.
Office Action dated May 21, 2014, in U.S. Appl. No. 13/250,878, 48 pages.
Office Action dated Feb. 11, 2014 in U.S. Appl. No. 13/436,526, 25 pages.
Response to Office Action filed May 12, 2014 in U.S. Appl. No. 13/436,526, 13 pages.
Bonanni, et al., "CounterIntelligence: Augmented Reality Kitchen," In Proceedings of the Conference of Abstracts of Computer Human Interaction, Apr. 2-7, 2005, ACM Press, 7 pages.
Guo, et al., "FoodJoy: What's for dinner? FoodJoy Helps you Decide", addy lee, HCI Masters Student Georgia Tech [online], 2005 [retrieved on Dec. 14, 2011], Retrieved from the Internet: <URL:http://www.addylee.com/hci/portfolio.htm>, 1 page.
Jang, et al., "Augmented Reality Cooking System Using Tabletop Display Interface", In Proceedings of the 5th International Symposium on Ubiquitous Virtual Reality, Jul. 2007, 2 pages.
Joutou, et al., "A Food Image Recognition System With Multiple Kernel Learning," 16th IEEE International Conference on Image Processing, Nov. 2009, pp. 285-288, 4 pages.
Lee, et al., "Design and Implementation of an Augmented Reality System Using Gaze Interaction", In Proceedings of the International Conference on Information Science and Applications, Apr. 26-29, 2011, 8 pages.
Mankoff, et al., "Domisilica: Providing Ubiquitous Access to the Home", In Technical Report, GVU, College of Computing Center, Georgia Institute of Technology, 1997 [retrieved on Dec. 14, 2011], retrieved from the Internet: <URL:http://www.cc.gatech.edu/fce/domisilica/publications/uist97.html>, 8 pages.
Real, et al., "Augmented reality system for inventorying," 2011 6th Iberian Conference on Information Systems and Technologies (CISTI), Jun. 18, 2011, 9 pages.
Välkkynen, et al., "Mobile Augmented Reality for Retail Environments", In Mobile HCI Workshop on Mobile Interaction in Retail Environments, Aug. 30, 2011, 4 pages.
Winlock, et al., "Toward Real-Time Grocery Detection for the Visually Impaired," IEEE Computer Society Conference on Computer Vision and Pattern Recognition Workshops, Jun. 2010, 8 pages.
U.S. Appl. No. 13/250,878, filed Sep. 30, 2011.
U.S. Appl. No. 13/436,526, filed Mar. 30, 2012.
Notice of Allowance dated Jun. 20, 2014 in U.S. Appl. No. 13/436,526, 12 pages.
Liarokapis, Fotis, "An Augmented Reality Interface for Visualizing and Interacting with Virtual Content", Draft Paper to Appear in Journal of Virtual Reality, vol. 11, Issue 1, Feb. 2007, 18 pages.
Narzt, et al., "Augmented Reality Navigation Systems", In Proceedings of Universal Access in the Information Society, vol. 4 Issue 3, Dec. 21, 2005, pp. 177-187, 11 pages.
Nilsen, et al., "Motivations for Augmented Reality Gaming", In Proceedings of FUSE, New Zealand Game Developers Conference, vol. 4, Jun. 29, 2004, 8 pages.
Vlahakis, et al., "Personalized Augmented Reality Touring of Archaeological Sites with Wearable and Mobile Computers", In Proceedings of the 6th International Symposium on Wearable Computers, Oct. 2002, 8 pages.
Doswell, et al., "Extending the 'Serious Game' Boundary: Virtual Instructors in Mobile Mixed Reality Learning Games", In Digital Games Research Association International Conference, Sep. 27, 2007, pp. 524-529, 6 pages.
Office Action dated Sep. 4, 2013 in U.S. Appl. No. 13/631,511, 32 pages.
"GSA Advanced Golf Simulators", [retrieved on Nov. 14, 2011], Retrieved from the Internet: <URL:http://www.golf-simulators.com/Software.htm>, 12 pages.
Conroy, "How to Create Your Own Virtual Golf Course Game", [retrieved on Nov. 14, 2011], Retrieved from the Internet: <URL:http://www.ehow.com/how_5672075_create-virtual-golf-course-game.html>, 5 pages.
Office Action dated Jul. 26, 2013 in U.S. Appl. No. 13/250,878, 24 pages.
Response dated Feb. 4, 2014 to Office Action in U.S. Appl. No. 13/631,511, 10 pages.
Response to Office Action dated Jun. 15, 2015 in U.S. Appl. No. 13/250,878, 11 pages.
Office Action dated Sep. 9, 2015 in U.S. Appl. No. 13/250,878, 50 pages.
Response to Office Action filed Aug. 21, 2014 in U.S. Appl. No. 13/250,878, 12 pages.
Office Action dated Oct. 10, 2014 in U.S. Appl. No. 13/436,526, 12 pages.
Final Office Action dated Nov. 21, 2014 in U.S. Appl. No. 13/250,878, 44 pages.
Response to Office Action filed Feb. 13, 2015 in U.S. Appl. No. 13/250,878, 11 pages.
Office Action dated Mar. 13, 2015 in U.S. Appl. No. 13/250,878, 41 pages.
Response to Office Action filed Jan. 12, 2015 in U.S. Appl. No. 13/436,526, 11 pages.

(56) References Cited

OTHER PUBLICATIONS

Notice of Allowance dated Feb. 13, 2015 in U.S. Appl. No. 13/436,526, 16 pages.
U.S. Appl. No. 15/061,886, filed Mar. 4, 2016.

* cited by examiner

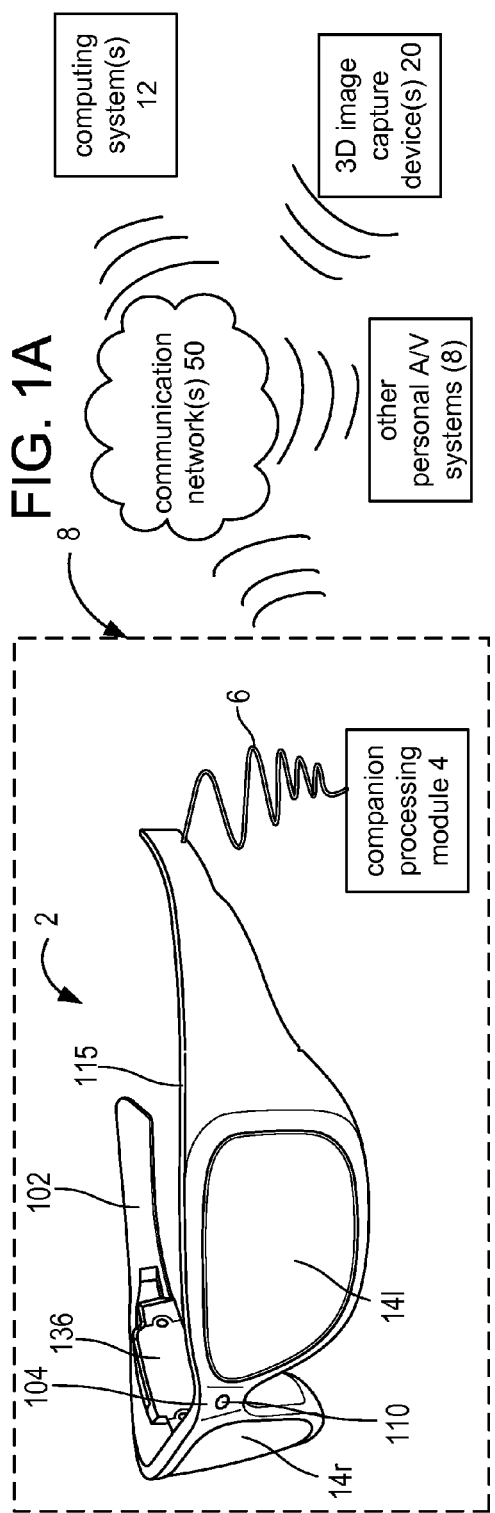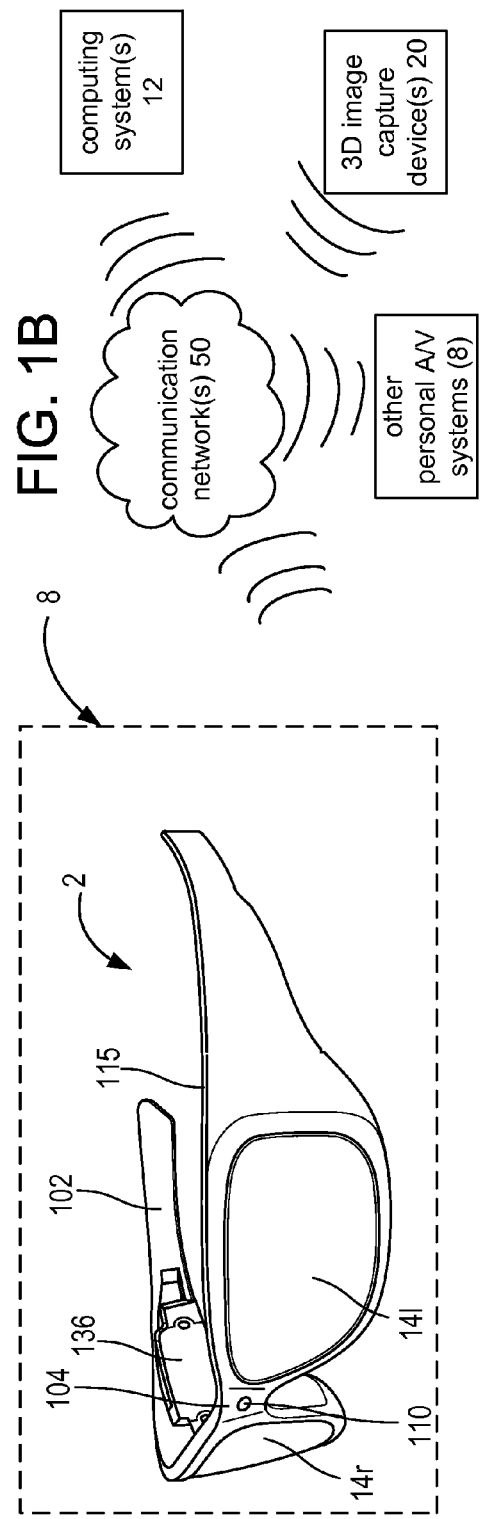

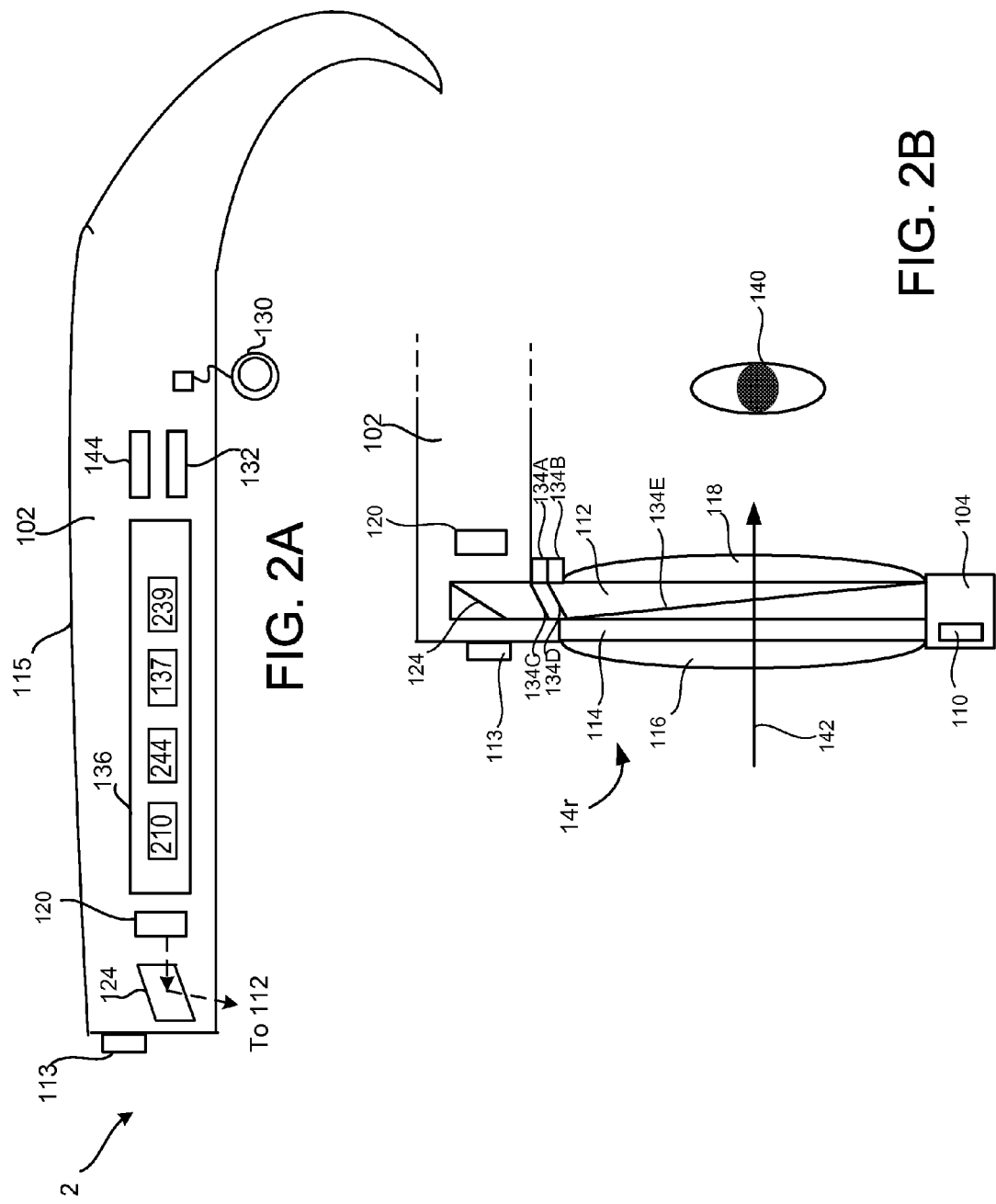

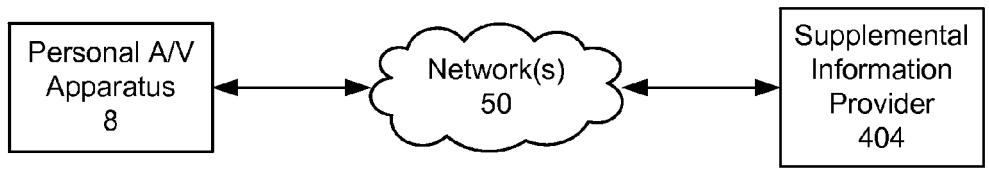
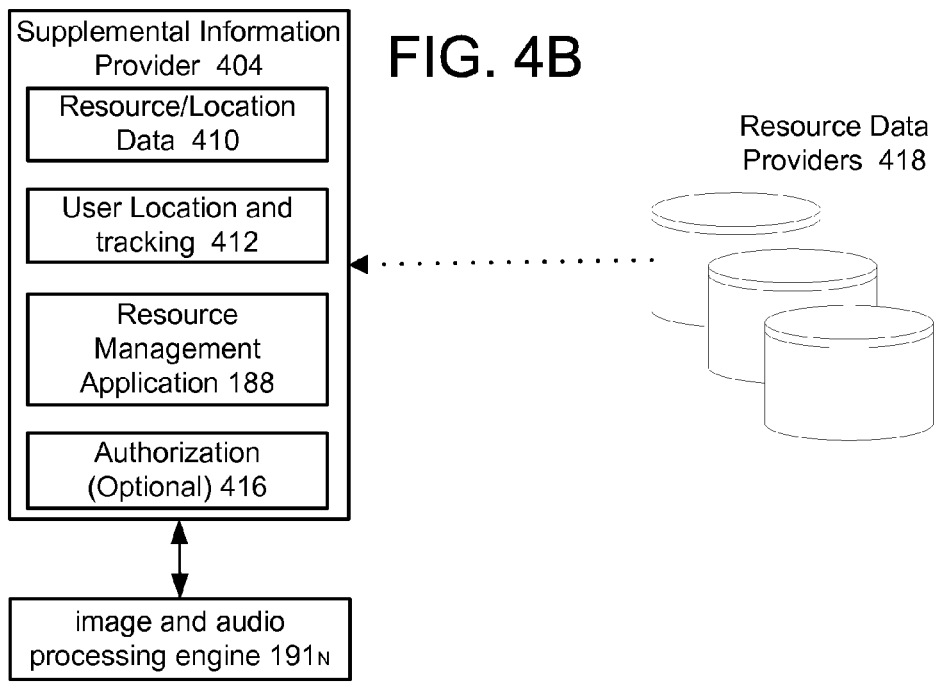
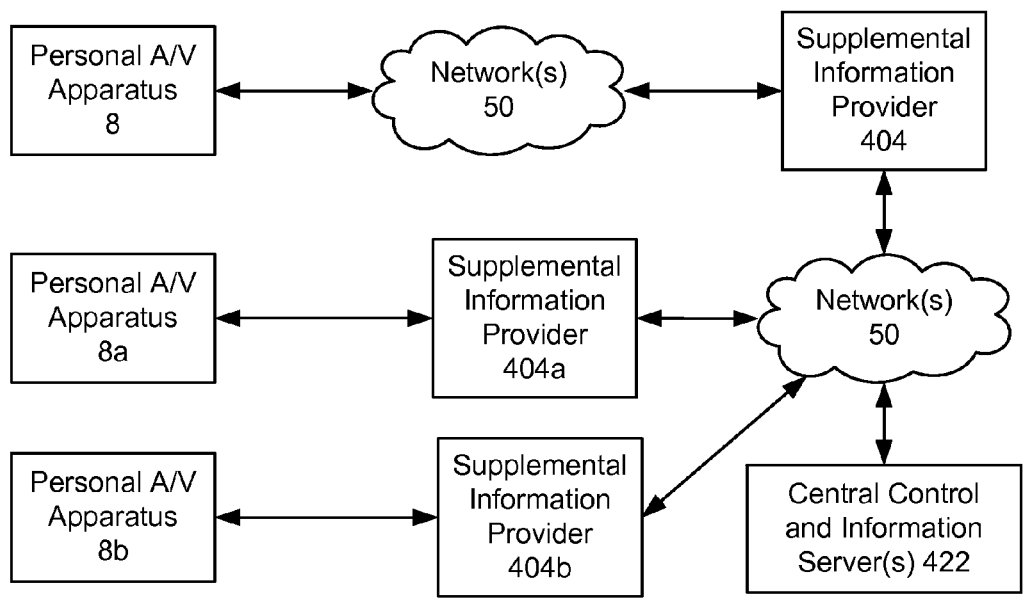

PERSONAL AUDIO/VISUAL APPARATUS PROVIDING RESOURCE MANAGEMENT

CROSS REFERENCE TO RELATED APPLICATION

This application is a continuation-in-part application of U.S. patent application Ser. No. 13/250,878 entitled "Personal Audio/Visual System," to K. Stone-Perez et al., filed Sep. 30, 2011, and incorporated herein by reference.

This application is also a continuation-in-part application of U.S. patent application Ser. No. 13/436,526 entitled "Personal Audio/Visual System Providing Allergy Awareness," to Kevin A. Geisner et al., filed Mar. 30, 2012, and incorporated herein by reference.

BACKGROUND

Keeping track of resources is part of home management as well as business management. Some examples of personal resources are food, household items for cleaning and personal grooming, and tools. People keep shopping lists to assist with identifying food or other resources to replenish on a next shopping trip. In another example, a person may try to remember what tools he or she has for assembling a product he or she is considering purchasing. An important part of resource management is being able to identify quickly what one has, where a resource item is located, and what resources are right for a task.

SUMMARY

Technology described herein provides various embodiments for resource management using at least one personal audiovisual (A/V) apparatus including a near-eye, augmented reality (AR) display supported by a near-eye support structure. At least one capture device on the near-eye support structure captures image data, depth data or both of a location in which the support structure is located. Different types of resources may be managed, some examples of which are food, tools and household cleaning products. A resource may be identified based on image data captured of the resource. A location and a three dimensional (3D) space position of the resource within the location may be tracked. One or more properties of a resource may also be tracked. Some examples of properties are an expiration date, a quantity, and a quality control indicator with respect to the resource. One or more personal A/V apparatus may supply data from which the resource may be tracked. One or more functions of a resource may also be stored for the resource as a basis for identifying its usability for a task.

The technology provides one or more embodiments of a method for providing resource management using one or more personal audiovisual (A/V) apparatus including a near-eye, augmented reality (AR) display. An embodiment of the method comprises automatically identifying a resource based on image data of the resource captured by at least one capture device of at least one personal A/V apparatus and object reference data and automatically tracking a 3D space position of the resource in a location identified based on location data detected by the at least one personal A/V apparatus. A property of the resource is automatically determined based on the image data of the resource and is automatically tracked. Image data related to the resource is automatically caused to be displayed in the near-eye, augmented reality display based on a notification criteria for the property associated with the resource.

The technology provides one or more embodiments of a personal audiovisual (A/V) apparatus including a near-eye, augmented reality display for providing resource management. An embodiment of the apparatus comprises the near-eye augmented reality display having a display field of view and being supported by a near-eye support structure. One or more processors are communicatively coupled to the near-eye, augmented reality display for controlling the display and are also communicatively coupled to at least one capture device on the near-eye support structure for receiving image data captured by the at least one capture device of a location in which the support structure is situated. The one or more processors automatically identify a real object in the image data based on object reference data stored in an accessible memory, and identify the real object as a resource falling within a category of a resource profile based on a type of object determined for the real object. A resource data record for the resource is associated with the resource profile in data stored in a memory by the one or more processors. Additionally, the one or more processors identify and store in the resource data record a three dimensional (3D) space position of the resource in the location based on the image data and a 3D mapping of the location.

The technology provides one or more processor readable storage devices comprising instructions which cause one or more processors to execute a method for providing resource management using one or more personal audiovisual (A/V) apparatus including a near-eye, augmented reality display. An embodiment of the method comprises automatically identifying a resource based on image data of the resource captured by at least one capture device of at least one personal A/V apparatus and object reference data, and automatically tracking a 3D space position of a resource in a location identified based on location data detected by the at least one personal A/V apparatus. A property of the resource is automatically determined based on the image data of the resource, and a function associated with the resource is automatically identified based on the object reference data. Data identifying the location of the resource, the property of the resource and the function associated with the resource is stored in a resource data record associated with the resource. The resource data record is associated with a resource profile associated with a user of the personal A/V apparatus.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a block diagram depicting example components of an embodiment of a personal audiovisual (A/V) apparatus having a near-eye, augmented reality display embodied as a see-through, augmented reality display.

FIG. 1B is a block diagram depicting example components of another embodiment of a personal audiovisual (A/V) apparatus having a near-eye, see-through, augmented reality display.

FIG. 2A is a side view of an eyeglass temple of a frame in an embodiment of the personal audiovisual (A/V) apparatus having a see-through, augmented reality display embodied as eyeglasses providing support for hardware and software components.

FIG. 2B is a top view of an embodiment of a display optical system of a near-eye, see-through, augmented reality display.

FIG. 4A is a block diagram of an embodiment of a supplemental information provider system communicatively coupled to a personal A/V apparatus for providing information regarding one or more resources to a user of the personal A/V apparatus.

FIG. 4B is a block diagram of an embodiment of a supplemental information provider system.

FIG. 4C is a block diagram of another embodiment of a supplemental information provider system communicatively coupled to a personal A/V apparatus and a central control and information server for providing information regarding one or more resources to a user of the personal A/V apparatus.

DETAILED DESCRIPTION

Figure 3A:
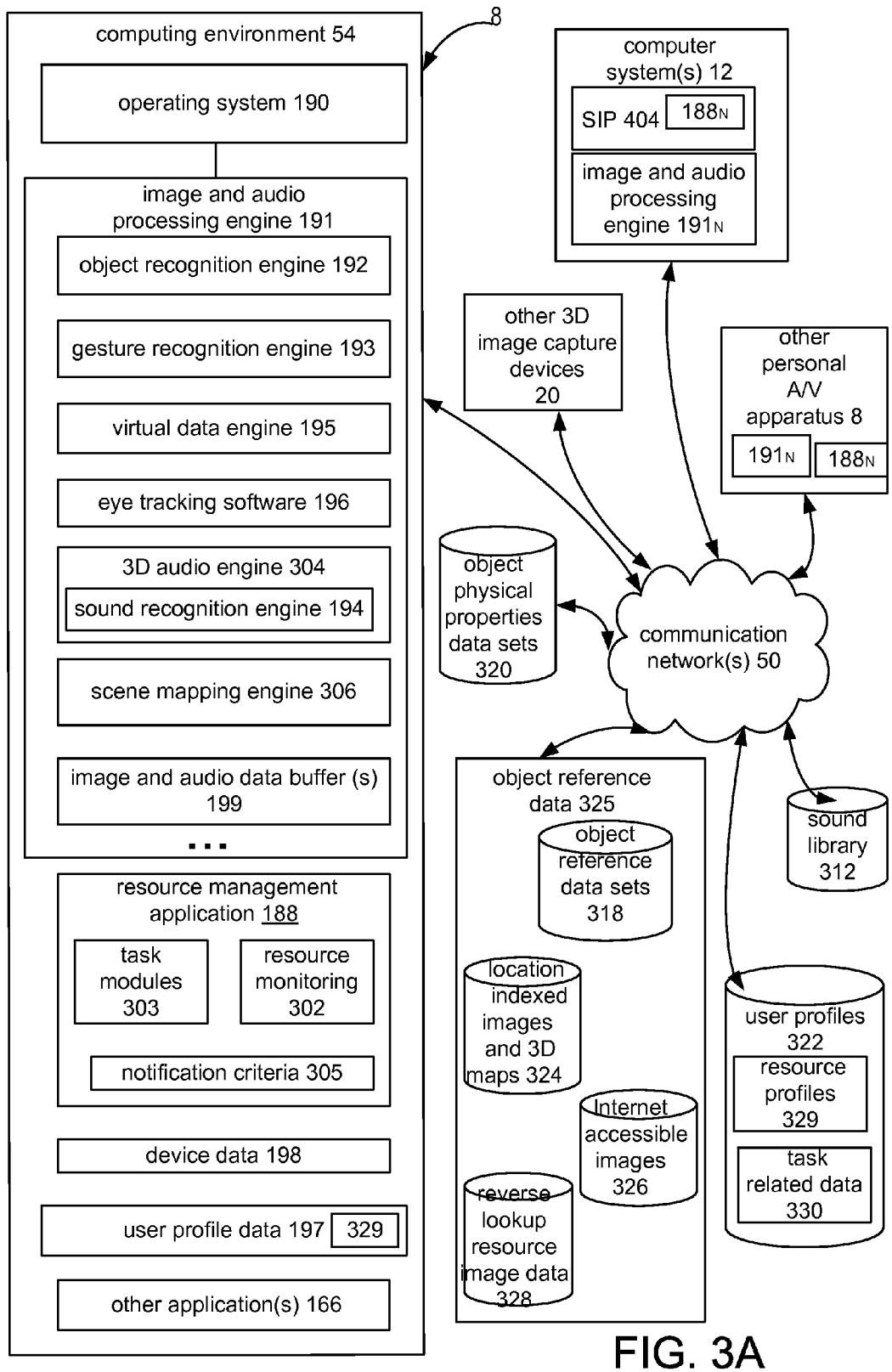
FIG. 3A is a block diagram of an embodiment of a system from a software perspective for providing resource management using one or more personal audiovisual (A/V) apparatus including a near-eye, augmented reality display of a personal audiovisual (A/V) apparatus.

A personal A/V apparatus including a near-eye, augmented reality (AR) display and at least one capture device for capturing image data may be used for resource management as discussed in the various embodiments described below. Some examples of resource management described below include tracking and storing information about a resource determined based on data captured or detected by at least the personal A/V apparatus. Some examples of information about the resource are location data, one or more properties of a resource, as well as one or more functions of a resource. The personal A/V apparatus can display image data, play audio data or both with respect to a resource a user is actually viewing or a virtual version of the resource, for example in accordance with a task like a budgeting task or a calorie counting task. Visual and audio aids may be output by the personal A/V apparatus to assist a user in finding a resource in her location or at a remote location. In some examples discussed below, the stored data for the resource can be searched for determining whether the resource can be used for a task, and identifying any missing resource for completing the task. In embodiments discussed below, the personal A/V apparatus can also detect natural user interface (NUI) input of at least one user physical action of at least one body part with respect to a resource and perform a task or display information about the resource responsive thereto.

Before describing some embodiments of a personal A/V apparatus with a near-eye, AR display, it is noted that there are different types of augmented reality displays. A user wearing a see-through, augmented reality personal A/V apparatus actually sees with his or her natural sight a real object, which is not occluded by image data of a virtual object or virtual effects, in a display field of view of the see-through display, hence the names see-through display and optical see-through display. For other types of augmented reality displays like video-see displays, sometimes referred to as video see-through displays, or a display operating in a video-see mode, the display is not really see-through, because the user does see real objects with his natural sight but is displayed image data of unoccluded real objects as they would appear with natural sight as well as image data of virtual objects and virtual effects. References to a see-through display below is in reference to an optical see-through display.

What a viewer sees from his point of view is his field of view. The term "display field of view" refers to the field of view of the display portion of the personal A/V system as the display portion is what the user looks through. Therefore, the display field of view may be used to approximate the user field of view. In some embodiments, the display field of view may be approximated by a view dependent coordinate system, having orthogonal X, Y and Z axes in which a Z-axis represents a depth position from a reference point on the front of the personal A/V apparatus or one or more points determined in relation to the front of the personal A/V apparatus like an approximate location for the user's foveae.

FIG. 1A is a block diagram depicting example components of an embodiment of a personal audiovisual (A/V) apparatus 8. Personal A/V apparatus 8 includes an optical see-through, augmented reality display device as a near-eye, augmented reality display device 2 in communication with a companion processing module 4 via a wire 6 in this example or wirelessly in other examples. In this embodiment, head mounted display device 2 is in the shape of eyeglasses in a frame 115, with a display optical system 14 for each eye in which image data is projected into a user's eye to generate a display of the image data while a user also sees through the display optical systems 14 for an actual direct view of the real world.

The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through, augmented reality display 14.

Frame 115 provides a support structure for holding elements of the system in place as well as a conduit for electrical connections. In this embodiment, frame 115 provides a convenient eyeglass frame as support for the elements of the system discussed further below. Some other example of a near-eye support structure are a visor frame or a goggles support. The frame 115 includes a nose bridge 104 with a microphone 110 for recording sounds and transmitting audio data to control circuitry 136. A side arm or temple 102 of the frame rests on each of a user's ears, and in this example the temple 102 is illustrated as including control circuitry 136 for the display device 2.

As illustrated in FIGS. 2A and 2B, an image generation unit 120 is included on each temple 102 in this embodiment as well. Also, not shown in this view, but illustrated in FIGS. 2A and 2B are outward facing capture devices 113, e.g. cameras, for recording digital image data such as still images, videos or both, and transmitting the visual recordings to the control circuitry 136 which may in turn send the captured image data to the companion processing module 4 which may also send the data to one or more computer systems 12 or to another personal A/V apparatus over one or more communication networks 50.

Figure 11:
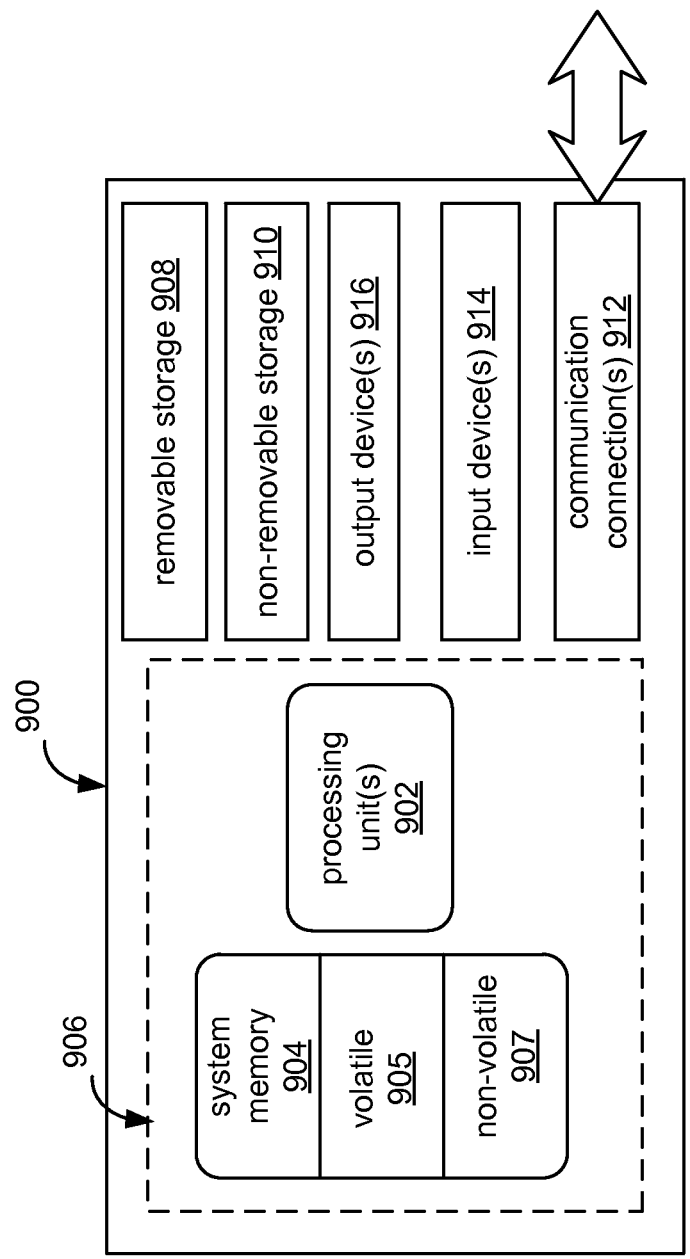
FIG. 11 is a block diagram of one embodiment of a computing system that can be used to implement a network accessible computer system or a companion processing module.

The companion processing module 4 may take various embodiments. In some embodiments, companion processing module 4 is a separate unit which may be worn on the user's body, e.g. a wrist, or be a separate device like a mobile device (e.g. smartphone). The companion processing module 4 may communicate wired or wirelessly (e.g., WiFi, Bluetooth, infrared, an infrared personal area network, RFID transmission, wireless Universal Serial Bus (WUSB), cellular, 3G, 4G or other wireless communication means) over one or more communication networks 50 to one or more computer systems 12 whether located nearby or at a remote location, other personal A/V apparatus 8 in a location or environment, for example as part of peer-to-peer communication, and if available, one or more 3D image capture devices 20 in the environment. In other embodiments, the functionality of the companion processing module 4 may be integrated in software and hardware components of the display device 2 as in FIG. 1B. Some examples of hardware components of the companion processing module 4 are shown in FIG. 11. One or more network accessible computer system(s) 12 may be leveraged for processing power and remote data access. An example of hardware components of a computer system 12 is shown in FIG. 11. The scale and number of components may vary considerably for different embodiments of the computer system 12 and the companion processing module 4.

An application may be executing on a computer system 12 which interacts with or performs processing for an application executing on one or more processors in the personal A/V apparatus 8. For example, a 3D mapping application may be executing on the one or more computers systems 12 and the user's personal A/V apparatus 8. In some embodiments, the application instances may perform in a master and client role in which a client copy is executing on the personal A/V apparatus 8 and performs 3D mapping of its display field of view, receives updates of the 3D mapping from the computer system(s) 12 including updates of objects in its view from the master 3D mapping application and sends image data, and depth and object identification data, if available, back to the master copy. Additionally, in some embodiments, the 3D mapping application executing on different personal A/V apparatus 8 in the same environment share data updates in real time, for example real object identifications and resource locations in a peer-to-peer configuration between apparatus 8.

As described further below, a location in which a resource is situated is identified for tracking purposes and to assist a user in finding the resource. The location may include layers of location or sub-locations. For example, when looking for an extension cord, the personal A/V apparatus 8 can display data identifying that the extension cord is in the kitchen, and also that it is in the second draw to the left of the sink. The personal A/V apparatus 8 may rely on a location sensing unit 144 for identifying a room or outdoor area where the wearer is located initially and retrieve or generate a 3D map of the location. Image data from the mapping can be used to identify a sub-location some examples of which area a shelf, bag, tool chest, sewing box, cupboard, bathroom cabinet or other storage locations.

In the illustrated embodiments of FIGS. 1A and 1B, the one or more computer system 12 and the personal A/V apparatus 8 also have network access to one or more 3D image capture devices 20 which may be, for example one or more cameras that visually monitor one or more users and the surrounding space such that gestures and movements performed by the one or more users, as well as the structure of the surrounding space including surfaces and objects, may be captured, analyzed, and tracked. The image and depth data of the one or more 3D capture devices 20 may supplement data captured by one or more capture devices 113 on the near-eye, AR display device 2 of the personal A/V apparatus 8 and other personal A/V apparatus 8 in a location for 3D mapping, gesture recognition, object recognition, resource tracking, and other functions as discussed further below.

The one or more capture devices 20 may be one or more depth cameras positioned in a user environment. According to an example embodiment, each capture device 20 may be configured with RGB and IR components to capture video with depth information including a depth image that may include depth values via any suitable technique including, for example, time-of-flight, structured light, stereo image, or the like. According to one embodiment, the capture device 20 may organize the depth information into "Z layers," or layers that may be perpendicular to a Z axis extending from the depth camera along its line of sight. The depth image may include a two-dimensional (2-D) pixel area of the captured field of view where each pixel in the 2-D pixel area may represent a length in, for example, centimeters, millimeters, or the like of an object in the captured field of view from the camera.

FIG. 1B is a block diagram depicting example components of another embodiment of a personal audiovisual (A/V) apparatus having a see-through, augmented reality display which may communicate over a communication network 50 with other devices. In this embodiment, the control circuitry 136 of the display device 2 incorporates the functionality which a companion processing module 4 provides in FIG. 1A and communicates wirelessly via a wireless transceiver (see wireless interface 137 in FIG. 2A) over a communication network 50 to one or more computer systems 12 whether located nearby or at a remote location, other personal A/V apparatus 8 in a location or environment and, if available, a 3D image capture device in the environment.

FIG. 2A is a side view of an eyeglass temple 102 of a frame in an embodiment of the personal audiovisual (A/V) apparatus having a see-through, augmented reality display embodied as eyeglasses providing support for hardware and software components. At the front of frame 115 is depicted one of at least two physical environment facing capture devices 113, e.g. cameras, that can capture image data like video and still images, typically in color, of the real world to map real objects in the display field of view of the see-through display, and hence, in the field of view of the user.

In some examples, the capture devices 113 may also be depth sensitive, for example, they may be depth sensitive cameras which transmit and detect infrared light from which depth data may be determined. In other examples, a separate depth sensor (not shown) on the front of the frame 115 may also capture and provide depth data to objects and other surfaces in the display field of view. The depth data and image data form a depth map of the captured field of view of the capture devices 113 which are calibrated to include the display field of view. A three dimensional (3D) mapping of the display field of view can be generated based on the depth map. Some examples of depth sensing technologies that may be included on the head mounted display device 2 without limitation, are SONAR, LIDAR, Structured Light, and/or Time of Flight.

In some embodiments, the outward facing capture devices 113 provide overlapping image data from which depth information for objects in the image data may be determined based on stereopsis. Parallax and contrasting features such as color may also be used to resolve relative positions of real objects.

The capture devices 113 are also referred to as outward facing capture devices meaning facing outward from the user's head. The illustrated capture device 113 is a front facing capture device which is calibrated with respect to a reference point of its respective display optical system 14. One example of such a reference point is an optical axis (see 142 in FIG. 2B) of its respective display optical system 14. The calibration allows the display field of view of the display optical systems 14 to be determined from the data captured by the capture devices 113.

Control circuitry 136 provide various electronics that support the other components of head mounted display device 2. In this example, the right temple 102 includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, the microphone 110 and the sensor units discussed below. The processing unit 210 may comprise one or more processors including a central processing unit (CPU) and a graphics processing unit (GPU), particularly in embodiments without a separate companion processing module 4, which contains at least one graphics processing unit (GPU).

Inside, or mounted to temple 102, are an earphone of a set of earphones 130, an inertial sensing unit including one or more inertial sensors 132, a location sensing unit 144 including one or more location or proximity sensors, some examples of which are a GPS transceiver, an infrared (IR) transceiver, or a radio frequency transceiver for processing RFID data. In one embodiment, inertial sensing unit 132 includes a three axis magnetometer, a three axis gyro, and a three axis accelerometer as inertial sensors. The inertial sensors are for sensing position, orientation, and sudden accelerations of head mounted display device 2. From these movements, head position, and thus orientation of the display device, may also be determined. In this embodiment, each of the devices processing an analog signal in its operation include control circuitry which interfaces digitally with the digital processing unit 210 and memory 244 and which produces or converts analog signals, or both produces and converts analog signals, for its respective device. Some examples of devices which process analog signals are the sensor units 144, 132, and earphones 130 as well as the microphone 110, capture devices 113 and a respective IR illuminator 134A, and a respective IR detector or camera 134B for each eye's display optical system 14l, 14r discussed below.

Mounted to or inside temple 102 is an image source or image generation unit 120 which produces visible light representing images. The image generation unit 120 can display a virtual object to appear at a designated depth location in the display field of view to provide a realistic, in-focus three dimensional display of a virtual object which can interact with one or more real objects. Some examples of embodiments of image generation units 120 which can display virtual objects at various depths are described in the following applications which are hereby incorporated by reference: "Automatic Variable Virtual Focus for Augmented Reality Displays," having U.S. patent application Ser. No. 12/941,825 and inventors Avi Bar-Zeev and John Lewis, and which was filed Nov. 8, 2010 and "Automatic Focus Improvement for Augmented Reality Displays," having U.S. patent application Ser. No. 12/949,650 and inventors Avi Bar-Zeev and John Lewis, and which was filed Nov. 18, 2010. In these examples, a focal length for an image generated by the image generation unit 120 is changed by adjusting a displacement between an image source such as a microdisplay and at least one optical element like a lens or by adjusting the optical power of an optical element which receives the light representing the image. The change in focal length results in a change in a region of the field of view of the display device in which the image of the virtual object appears to be displayed. In one example, multiple images, each including a virtual object, may be displayed to the user at a rate rapid enough so human temporal image fusion makes the images appear to be present at once to human eyes. In another example, a composite image of the in-focus portions of the virtual images generated at the different focal regions is displayed.

In some embodiments, the image generation unit 120 includes a microdisplay for projecting images of one or more virtual objects and coupling optics like a lens system for directing images from the microdisplay to a reflecting surface or element 124. The reflecting surface or element 124 directs the light from the image generation unit 120 into a light guide optical element 112, which directs the light representing the image into the user's eye.

FIG. 2B is a top view of an embodiment of one side of an optical see-through, near-eye, augmented reality display device including a display optical system 14. A portion of the frame 115 of the near-eye display device 2 will surround a display optical system 14 for providing support and making electrical connections. In order to show the components of the display optical system 14, in this case 14r for the right eye system, in the head mounted display device 2, a portion of the frame 115 surrounding the display optical system is not depicted.

In the illustrated embodiment, the display optical system 14 is an integrated eye tracking and display system. The system embodiment includes an opacity filter 114 for enhancing contrast of virtual imagery, which is behind and aligned with optional see-through lens 116 in this example, light guide optical element 112 for projecting image data from the image generation unit 120 is behind and aligned with opacity filter 114, and optional see-through lens 118 is behind and aligned with light guide optical element 112.

Light guide optical element 112 transmits light from image generation unit 120 to the eye 140 of the user wearing head mounted, display device 2. Light guide optical element 112 also allows light from in front of the head mounted, display device 2 to be transmitted through light guide optical element 112 to eye 140, as depicted by an arrow representing an optical axis 142 of the display optical system 14r, thereby allowing the user to have an actual direct view of the space in front of head mounted, display device 2 in addition to receiving a virtual image from image generation unit 120. Thus, the walls of light guide optical element 112 are see-through. Light guide optical element 112 is a planar waveguide. A representative reflecting element 134E represents the one or more optical elements like mirrors, gratings, and other optical elements which direct visible light representing an image from the planar waveguide towards the user eye 140.

Infrared illumination and reflections, also traverse the planar waveguide for an eye tracking system 134 for tracking the position and movement of the user's eye, typically the user's pupil. Eye movements may also include blinks. The tracked eye data may be used for applications such as gaze detection, blink command detection and gathering biometric information indicating a personal state of being for the user. The eye tracking system 134 comprises an eye tracking IR illumination source 134A (an infrared light emitting diode (LED) or a laser (e.g. VCSEL)) and an eye tracking IR sensor 134B (e.g. IR camera, arrangement of IR photodetectors, or an IR position sensitive detector (PSD) for tracking glint positions). In this embodiment, representative reflecting element 134E also implements bidirectional infrared (IR) filtering which directs IR illumination towards the eye 140, preferably centered about the optical axis 142 and receives IR reflections from the user eye 140. In some examples, as part of the integrated eye tracking and display system, representative reflecting element 134E may include a hot mirror or gratings for implementing the bidirectional IR filtering. A wavelength selective filter 134C passes through visible spectrum light from the reflecting surface or element 124 and directs the infrared wavelength illumination from the eye tracking illumination source 134A into the planar waveguide. Wavelength selective filter 134D passes the visible light and the infrared illumination in an optical path direction heading towards the nose bridge 104. Wavelength selective filter 134D directs infrared radiation from the waveguide including infrared reflections of the user eye 140, preferably including reflections captured about the optical axis 142, out of the light guide optical element 112 embodied as a waveguide to the IR sensor 134B.

In other embodiments, the eye tracking unit optics are not integrated with the display optics. For more examples of eye tracking systems for HMD devices, see U.S. Pat. No. 7,401,920, entitled "Head Mounted Eye Tracking and Display System", issued Jul. 22, 2008 to Kranz et al., see U.S. patent application Ser. No. 13/221,739, Lewis et al., entitled "Gaze Detection in a See-Through, Near-Eye, Mixed Reality Display," filed Aug. 30, 2011, and see U.S. patent application Ser. No. 13/245,700, Bohn, entitled "Integrated Eye Tracking and Display System," filed Sep. 26, 2011, all of which are incorporated herein by reference.

Opacity filter 114, which is aligned with light guide optical element 112, selectively blocks natural light from passing through light guide optical element 112 for enhancing contrast of virtual imagery. The opacity filter assists the image of a virtual object to appear more realistic and represent a full range of colors and intensities. In this embodiment, electrical control circuitry for the opacity filter, not shown, receives instructions from the control circuitry 136 via electrical connections routed through the frame. More details of an opacity filter are provided in U.S. patent application Ser. No. 12/887,426, "Opacity Filter For See-Through Mounted Display," filed on Sep. 21, 2010, incorporated herein by reference in its entirety.

Again, FIGS. 2A and 2B show half of the head mounted display device 2. For the illustrated embodiment, a full head mounted display device 2 would include another display optical system 14 with another set of optional see-through lenses 116 and 118, another opacity filter 114, another light guide optical element 112, as well as another image generation unit 120, another physical environment facing capture device 113 (also referred to as outward facing or front facing capture device 113), eye tracking system 134, and another earphone 130. In some embodiments, there may be a continuous display viewed by both eyes, rather than a display optical system for each eye. Additional details of a head mounted personal A/V apparatus are illustrated in U.S. patent application Ser. No. 12/905,952 entitled Fusing Virtual Content Into Real Content, Filed Oct. 15, 2010, fully incorporated herein by reference.

FIG. 3A is a block diagram of an embodiment of a system from a software perspective for providing resource management by a personal audiovisual apparatus including a near-eye, augmented reality display of a personal audiovisual (A/V) apparatus. FIG. 3A illustrates a computing environment embodiment 54 from a software perspective which may be implemented by a system like personal A/V apparatus 8, one or more remote computer systems 12 in communication with one or more personal A/V apparatus or a combination of these. Additionally, a personal A/V apparatus can communicate with other personal A/V apparatus for sharing data and processing resources. Network connectivity allows leveraging of available computing resources. A resource management application 188 may be executing on one or more processors of the personal A/V apparatus 8. In the illustrated embodiment, a supplemental information provider system 404 executing on a remote computer system 12 can also be executing a version of the remote management application 188 as well as other personal A/V apparatus 8 with which it is in communication. Some examples of functions which software modules may implement in an embodiment of the resource management application 188 are resource monitoring 302 and tasks 303 whose actions are based on data related to a property, location or function of a resource.

In the illustrative example, the resource management application 188 comprises a resource monitoring module 302 which identifies a resource based on image data as well as one or more properties and tracks its location and properties over time. As the object recognition engine 192 discussed below is automatically identifying objects and determining what types of objects they are, the resource monitoring module 302 is automatically identifying which of these objects are a resource falling within a category of resource profile based on the type of object recognized from image data. The resource monitoring module 302 creates a resource data record 220 for each object identified as a resource based on object properties identified by the object recognition engine 192 as well as other data such as text or image which may be searched for additional properties information. The resource management application 188 can start automatically profiling resources into resource profiles 329 based on stored default categories like food, tools, medicines, etc. A category of resource profile can also be added via user input. The resource management application 188 maintains one or more resource profiles 329 for a user which in this embodiment are linked to user profile data 197 stored locally or user profile data 322 stored in the cloud.

One or more task modules 303 may also be included which typically cause the personal A/V apparatus to output data either on the near-eye AR display or through audio output devices, like earphones 130, or both based on an aspect of a resource like a property (e.g. a type of object it is, number of calories it contains, its cost, etc.), a location of a resource, or a function of a resource which may be usable for an identified activity.

The one or more task modules 303 may be plug-in modules so that new tasks may be added over time. A task module displays or plays task data related to its respective activity and one or more resources related to the activity. Some examples of tasks are generating and updating a shopping list for a user for a type of resource like food, clothing, or automotive supplies, an eating monitoring task which provides nutritional value and calorie data, a budgeting task, a resource location task, a task for identifying the availability of one or more resources for an activity and a task for identifying an activity which may be completed with currently available resources. Task related data 330 generated by the task modules such as shopping lists, budgets, medicine and food diaries may be stored in user profile data as well. As discussed further below, a task may process natural user interface (NUI) user input of a user physical action of at least one body part with respect to a resource or another object for determining to which resource or object the task is applicable.

The notification criteria 305 may be implemented in some examples as a set of rules, and the resource monitoring module and the one or more task modules may store and process respective notification criteria for determining when to display data typically related to a property, location or function of the resource. For example, notification criteria 305 for a property or location of a resource may be accessed by the resource monitoring module for determining whether data to notify the user about a state of a property or a location change is to be output by the personal A/V apparatus 8. For example, an expiration date may be a property for a food resource like a gallon of milk. Notification criteria may indicate displaying a message in the near-eye AR display a few days before the expiration date indicating the expiration date for the milk is near. A change in a property or location which satisfies notification criteria 305 can be identified based on image data captured by a capture device of another personal A/V apparatus 8 or coupled to another computer system which sends updates either directly to the user's personal A/V apparatus 8 or a centralized resource management application 188 executing on a network accessible computer system 12 which maintains network accessible or master copies of data related to resources.

As shown in the embodiment of FIG. 3A, the software components of a computing environment 54 comprise an image and audio processing engine 191 in communication with an operating system 190. Image and audio processing engine 191 processes image data (e.g. moving data like video or still data), and audio data in order to support applications executing for a near-eye, augmented reality personal A/V apparatus 8. Image and audio processing engine 191 includes object recognition engine 192, gesture recognition engine 193, virtual data engine 195, eye tracking software 196 if eye tracking is in use, a 3D positional audio engine 304 with a sound recognition engine 194, and a scene mapping engine 306 which may communicate with each other. Other software (not shown) may be included in the image and audio processing engine 191 as well like an occlusion engine and a physics engine. The computing environment 54 also stores data in image and audio data buffer(s) 199.

Image and audio processing engine 191 processes image data (e.g. video or image), depth data and audio data received in the buffers 199 from one or more capture devices which may be available in a location such as the outward facing capture devices 113 on the personal A/V apparatus 8, the microphone 110 which is an audio capture device, other personal A/V apparatus 8 in the location, any other network accessible 3D image capture devices 20 which may be in the location, and stored image data and depth data such as may be obtained from the location indexed images and 3D maps data stores 324. The buffers 199 may also hold image data of virtual objects to be displayed by the image generation units 120, image data from the eye tracking system 134, input audio data from the microphone 110 and output audio data for an application to be output by the 3D audio engine 304.

The individual engines and data stores depicted in FIG. 3A are described in more detail below, but first an overview of the data and functions they provide as a supporting platform is described from the perspective of an application like the resource management application 188 and other applications 166 which may be executing on the personal A/V apparatus 8. The resource management application 188 executing in the personal A/V apparatus including a near-eye, augmented reality display or executing remotely on a computer system 12 for the personal A/V apparatus 8 leverages the various engines of the image and audio processing engine 191 for implementing its one or more functions by sending requests identifying data for processing and receiving notification of data updates. For example, notifications from the scene mapping engine 306 identify the positions of virtual and real objects at least in a display field of view of the near-eye, AR display.

The object recognition engine 192 detects and identifies real objects based on received image data from one or more capture devices 113, 20 and object reference data 325. The identification may also be performed based on depth data derived from the image data, captured depth data if available, or a combination of these. The object recognition engine 192 may store an object properties data set $320_N$ for a detected object satisfying resource criteria and for which an object properties data set $320_N$ is not already stored. The resource management application 188 can request the virtual data engine 195 to generate and cause to be displayed a virtual object version of the resource based on the structure and physical properties detected and stored in its corresponding object properties data set $320_N$.

The operating system 190 notifies the resource management application 188 of one or more gestures the gesture recognition engine 193 has identified or for which the resource management application 188 has registered for notification, which words or sounds the sound recognition engine 194 has identified, the positions of objects from the scene mapping engine 306 as described above, and eye data such as a position of a pupil or an eye movement like a blink sequence detected from the eye tracking software 196. A sound or audio data to be played for the user in accordance with the resource management application 188 can be uploaded to a sound library 312 and identified to the 3D audio engine 304 with data identifying from which direction or position to make the sound or audio data seem to come from. The device data 198 makes available to the resource management application 188 location data and orientation data of the display device 2 with respect to the ground and other data from sensing units of the personal A/V apparatus 8.

The scene mapping engine 306 is first described. A 3D mapping of the display field of view of the augmented reality display can be determined by the scene mapping engine 306 based on captured image data, and captured depth data if available, for the display field of view. The 3D mapping includes 3D space positions or position volumes for objects. A 3D space is a volume of space occupied by the object. Depending on the precision desired, the 3D space can match the 3D shape of the object or be a less precise volume like a bounding shape like a bounding box or bounding ellipse around an object. A 3D space position represents position coordinates for the volume or 3D space. In other words the 3D space position identifies how much space an object occupies and where in the display field of view that occupied space is.

As mentioned above, a view dependent coordinate system may be used to represent a 3D mapping of the display field of view. A depth map representing the captured image data and depth data received from the capture devices 113 on the personal A/V apparatus may be used as a 3D mapping of the display field of view. Tracking an orientation of the display device 2 and performing image alignment can generate more depth map data for mapping what is around a user in a location. For example, data from the orientation sensing unit 132 identifies position changes of the display device 2 being worn on a user's head correlate to head position changes, and hence field of view changes. Correlation of those head position changes with changes in the image and depth data from the front facing cameras 113 can identify positions of objects relative to one another and at what subset of an environment or location a user is looking.

A depth map representing the display field of view can be compared with depth map data received from another personal A/V apparatus 8 or another 3D image capture device 20, currently or previously in the location, along with orientation data for this other personal A/V apparatus or 3D image capture device 20 for mapping what is in the user location. Shared real objects detected in their depth maps can be used for image alignment and other techniques for mapping 3D space positions of objects in a location.

The scene mapping engine 306 can also use a view independent coordinate system for 3D mapping. The map can be stored in the view independent coordinate system in a storage location (e.g. 324) accessible as well by other personal A/V apparatus 8, other computer systems 12 or both, be retrieved from memory and be updated over time as one or more users enter or re-enter the location. Object positions in a location can be determined based on alignment of images of the location. The registration of objects onto a common coordinate system allows the scene mapping engine to be able to compare and integrate real-world objects, landmarks, or other features extracted from the different images into a unified 3-D map associated with the real-world environment.

When a user enters a location, the scene mapping engine 306 may first search for a pre-generated 3D map identifying 3D space positions and identification data of objects stored locally or accessible from another personal A/V apparatus 8 or a network accessible computer system 12. The map may include stationary objects. The map may also include objects moving in real time and current light and shadow conditions if the map is presently being updated by another system. For example, a pre-generated map indicating positions, identification data and physical properties of stationary objects in a user's living room derived from image and depth data from previous sessions of the personal A/V apparatus 8 can be retrieved from memory. Additionally, identification data including physical properties for objects which tend to enter the location can be preloaded for faster recognition. A pre-generated map may also store physics models for objects as discussed below. A pre-generated map may be stored in a network accessible database like location indexed image and map data stores 324.

The location may be identified by location data which may be used as an index to search in the location indexed image and pre-generated 3D map data stores 324 or in Internet accessible images 326 for a map or image related data which may be used to generate a map. For example, location data such as GPS data from a GPS transceiver of the location sensing unit 144 on the display device 2 may identify the location of the user. Additionally, an IP address of a WiFi hotspot or cellular station to which the personal A/V apparatus 8 has a connection can identify a location. Cameras at known positions within a location may identify the user and other people through facial recognition. Additionally, identifier tokens may be exchanged between personal A/V apparatus 8 via infra-red, Bluetooth or WUSB. The range of the infra-red, WUSB or Bluetooth signal can act as a predefined distance for determining proximity of another user. Maps and map updates, or at least object identification data may be exchanged between personal A/V apparatus via infra-red, Bluetooth or WUSB as the range of the signal allows.

An example of image related data which may be used to generate a map is meta data associated with any matched image data, from which objects and their positions within a coordinate system for the location can be identified. For example, a relative position of one or more objects in image data from the outward facing capture devices 113 of the user's personal A/V apparatus 8 can be determined with respect to one or more GPS tracked objects in the location from which other relative positions of real and virtual objects can be identified.

Image and depth data from multiple perspectives can be received in real time from other 3D image capture devices 20 under control of one or more network accessible computer systems 12 or from at least one other personal A/V apparatus 8 in the environment. Depth images from multiple perspectives may be combined based on a view independent coordinate system for describing an environment (e.g. an x, y, z representation of a room, a store space, or a geofenced area) for creating the volumetric or 3D mapping. For example, if the scene mapping engine 306 receives depth images from multiple cameras, the engine 306 correlates the images to have a common coordinate system by lining up the images and uses depth data to create the volumetric description of the environment. The scene mapping engine 306 identifies the position and tracks the movement of real and virtual objects in the volumetric space based on communications with the object recognition engine 192 of the image and audio processing engine 191 and one or more executing applications 166 generating virtual objects like the resource management application 188. The scene mapping engine 306 may be in communication with other scene mapping engines 306 executing in other systems (e.g. 12 and 8).

In some instances, a scene mapping engine 306 on a network accessible computer system 12 receives image data of multiple display fields of view from multiple augmented reality personal A/V apparatus 8 in an environment and correlates their image data based on capture times for the data in order to track changes of objects and lighting and shadow in the environment in real time. 3D map updates can then be sent to the multiple personal A/V apparatus 8 in the environment. (For more information on collaborative scene mapping between HMDs like system 8 and hub computer systems 12 with access to image data, see "Low-Latency Fusing of Virtual and Real Content," having U.S. patent application Ser. No. 12/912,937 having inventors Avi Bar-Zeev et al. and filed Oct. 27, 2010 and which is hereby incorporated by reference.)

In some examples, a 3D mapping, whether it be a depth map generated by front facing cameras 113 including a display field of view, a 3D mapping of an environment or a location in a view independent coordinate system, or somewhere in between, may be modeled as a 3D mesh of an environment. A mesh may comprise a detailed geometric representation of various features including real and virtual objects and surfaces thereof within a particular environment or region of an environment. A 3D point cloud representing the surfaces of objects including things like walls and floors in a space can be generated based on captured image data and depth data of the user environment. A 3D mesh of the surfaces in the environment can then be generated from the point cloud. More information regarding the generation of 3-D maps can be found in U.S. patent application Ser. No. 13/017,690, "Three-Dimensional Environment Reconstruction," incorporated herein by reference in its entirety. 3D mesh representations of virtual objects can be added.

The object recognition engine 192 of the image and audio processing engine 191 detects, tracks and identifies real objects in three dimensions in the display field of view and the location of the user based on comparing received image data and, in some embodiments received depth data, with object reference data 325. In this embodiment, object reference data 325 comprises accessible object reference data sets 318 which include structure data 200, which may be three dimensional structure data, as well as image data which may be searched for identifying objects including objects which are resources. Internet accessible images 326 include generally accessible image data bases as well as any image databases to which the user has access permission. Location indexed images and 3D maps data stores 324 besides being used for identifying a location may also be used for object recognition. Facial and pattern recognition as well as metadata searching may be performed for the image data by the object recognition engine 192. The reverse lookup resource image data 328 as discussed further below for FIGS. 3D and 3E includes images of resources identified previously by an instantiation of the resource management application 188. In some embodiments, a resource management application 188N executing on a computer system 12 may have access to resource profiles 329 associated with different users, resource image data as provided by product manufacturers and retailers, or both. As permitted, the resource management application 188N builds up a reverse lookup resource image data 328 for identifying resources more quickly from image data. As discussed further below, resource growers, manufacturers, retailers, distributors and the like may also generate and make network accessible object reference data sets 318 including structure data 200 for identifying their products.

The object recognition engine 192 distinguishes real objects from each other by marking object boundaries and comparing the object boundaries with structural data. One example of marking object boundaries is detecting edges within detected or derived depth data and image data and connecting the edges. The object boundary data is then compared with stored structure data 200 as may be stored in object reference data sets 318 in order to identify a type of object within a probability criteria. Besides identifying the type of object, an orientation of an identified object may be detected based on the comparison with the stored structure data 200 accessible over one or more communication networks 50. A polygon mesh may also be used to represent the object's boundary as mentioned above.

As in other image processing applications, a person can be a type of object, so an example of structure data is a stored skeletal model of a human which may be referenced to help recognize body parts. Structure data 200 may also include structural information regarding one or more inanimate objects in order to help recognize the one or more inanimate objects, some examples of which are furniture, sporting equipment, automobiles and the like.

The object recognition engine 192 may also perform facial and pattern recognition on image data of the objects based on stored image data from other sources as well like user profile data 197 of the user, other users profile data 322 accessible via a computer system 12, location indexed images and 3D maps data stores 324 and Internet accessible images 326. Motion capture data from image and depth data may also identify motion characteristics of an object. The object recognition engine 192 may also check detected properties of an object against reference properties of an object like its size, shape and motion characteristics. An example of such a set of reference properties for an object is an object reference data set as stored in one or more object reference data sets 318.

The scene mapping engine 306 and the object recognition engine 192 exchange data which assist each engine in its functions. For example, based on an object identification and orientation determined by the object recognition engine 192, the scene mapping engine 306 can update a 3D space position or position volume for an object for more accuracy. For example, a chair on its side has a different volume than when it is right side up. A position history or motion path identified from position volumes updated for an object by the scene mapping engine 306 can assist the object recognition engine 192 track an object, particularly when it is being partially occluded.

Upon detection of one or more objects by the object recognition engine 192, image and audio processing engine 191 may report to operating system 190 an identification of each object detected and a corresponding position and orientation which the operating system 190 passes along to other executing applications like the scene mapping engine 306 and other upper level applications 166 like the resource management application 188.

The 3D audio engine 304 is a positional 3D audio engine which receives input audio data and outputs audio data for the earphones 130 or other output audio devices like speakers in other embodiments. The received input audio data may be for a virtual object or be that generated by a real object. Audio data for virtual objects generated by an application can be output to the earphones to sound as if coming from the direction of the virtual object projected into the display field of view. An example of a positional 3D audio engine which may be used with an augmented reality system is disclosed in U.S. patent application Ser. No. 12/903,610 entitled "System and Method for High-Precision 3-Dimensional Audio for Augmented Reality," to Flaks et al., and filed Oct. 13, 2010, which is hereby incorporated by reference.

Sound recognition software engine 194 of the 3D audio engine identifies audio data from the real world received via microphone 110 for application control via voice commands and for environment and object recognition. Based on a sound library 312, the engine 304 can identify a sound with a physical object, e.g. a horn sound associated with a certain make or model of car. Additionally, voice data files stored in user profile data 197 or user profiles 322 may also identify a speaker with whom a person object mapped in the environment may be associated. In addition to uploading their image data, personal A/V apparatus 8 and one or more 3D image capture devices 20 in a location upload their captured audio data to a network accessible computer system 12. Additionally, pre-generated 3D maps of a location can provide an audio index of sounds of objects fixed in the location or which enter and leave the location on a regular basis, e.g. train and bus sounds.

The outward facing capture devices 113 in conjunction with the object recognition engine 192 and gesture recognition engine 193 implements a natural user interface (NUI) in embodiments of the personal A/V apparatus 8. The gesture recognition engine 193 processes input image and, if available captured depth data, and identifies a user physical action of at least one body part that is interpreted as a command or request for data. In the embodiment of FIG. 3A, the natural user interface also includes the eye tracking software 196 and the eye tracking system 134 in that other user physical actions of at least one body part such as an eye can be interpreted as commands or requests. Eye based actions like a blink sequence indicating a command, a gaze pattern, or gaze duration identified by the eye tracking software 196 are also some examples of physical action user input. The microphone and sound recognition software 194 can process natural user interface input of audio data, for example voice commands or sounds, which may also supplement other recognized physical actions such as gestures and eye gaze.

In one example of determining gaze, the eye tracking software 196 executing on one or more processors of the personal A/V apparatus 8 identifies a pupil position within each eye and models a gaze line for each eye extending from an approximated location of a respective fovea. The one or more processors executing the eye tracking software 196 determine a position in the display field of view where the gaze lines meet. This intersection is the point of gaze, and it is within the Panum's fusional area for human eyes which is the area in which objects are in focus. Based on a 3D mapping of objects in the display field of view, an object at which the gaze lines are determined to meet is an object of focus.

The gesture recognition engine 193 can identify actions performed by a user indicating a control or command to an executing application. The action may be performed by at least one body part of a user, e.g. a hand or finger, but also an eye blink sequence of an eye can be a gesture. In one embodiment, the gesture recognition engine 193 includes a collection of gesture filters, each comprising information concerning a gesture that may be performed by at least a part of a skeletal model. The gesture recognition engine 193 compares a skeletal model and movements associated with it derived from the captured image data to the gesture filters in a gesture library to identify when a user (as represented by the skeletal model) has performed one or more gestures. In some examples, matching of image data to image models of a user's hand or finger during gesture training sessions may be used for recognizing gestures.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

Virtual data engine 195 processes virtual objects and registers the 3D position and orientation of virtual objects or imagery in relation to one or more coordinate systems, for example in display field of view coordinates or in the view independent 3D map coordinates. The virtual data engine 195 determines the position of image data of a virtual object or imagery in display coordinates for each display optical system 14. Additionally, the virtual data engine 195 performs translation, rotation, and scaling operations for display of the virtual data at the correct size and perspective. A virtual data position may be dependent upon, a position of a corresponding object, real or virtual, to which it is registered. The virtual data engine 195 can update the scene mapping engine about the positions of the virtual objects processed.

The following discussion describes some example processing for updating a see-through, augmented reality display to position virtual objects so that they appear realistically at 3D locations determined for them in the display. In one example implementation of updating the 3D display, the virtual data engine 195 renders the previously created three dimensional model of the display field of view including depth data for both virtual and real objects in a Z-buffer. The real object boundaries in the Z-buffer act as references for where the virtual objects are to be three dimensionally positioned in the display as the image generation unit 120 displays just the virtual objects as the display device is an optical see-through display device. For a virtual object, the virtual data engine 195 has a target space position of where to insert the virtual object. In some examples, the virtual object target position is registered to a position of a real world object, and in other examples, the virtual object is independent of a particular real object.

A depth value is stored for each display element or a subset of display elements, for example for each pixel (or for a subset of pixels). Virtual images corresponding to virtual objects are rendered into the same z-buffer and the color information for the virtual images is written into a corresponding color buffer. The virtual images may include any modifications to virtual image data based on collision processing. In this embodiment, the composite image based on the z-buffer and color buffer is sent to image generation unit 120 to be displayed at the appropriate pixels. The display update process can be performed many times per second (e.g., the refresh rate).

For a video-see, augmented reality display or operation of a see-through display in a video-see mode, image data of the real objects is also written into the corresponding color buffer with the virtual objects. In an example of operation of a see-through display in a video-see mode, the opacity filter of each see-through display optical system 14 can be tuned so that light reflected from in front of the glasses does not reach the user's eye 140 and the 3D image data of both the real and virtual objects is played on the display.

Device data 198 may include an identifier for the computer system 8, a network address, e.g. an IP address, model number, configuration parameters such as devices installed, identification of the operating system, and what applications are available in the personal A/V apparatus 8 and are executing in the display system 8 etc. Particularly for the see-through, augmented reality personal A/V apparatus 8, the device data may also include data from sensors or sensing units or determined from sensing units or sensors like the orientation sensors in inertial sensing unit 132, the microphone 110, and the one or more location and proximity transceivers in location sensing unit 144.

User profile data, in a local copy 197 or stored in a cloud based user profile 322 has data for user assignments of permissions for sharing or accessing of user profile data and other data detected for the user like location tracking, objects identified which the user has gazed at, biometric data or states of being determined. In this example, one or more resource profiles 329 associated with a user are stored in a local copy of user profile data 197 as well as a cloud based copy of the user's user profile data 322. Resource profiles are discussed in more detail below with respect to FIG. 3E.

Figure 3B:
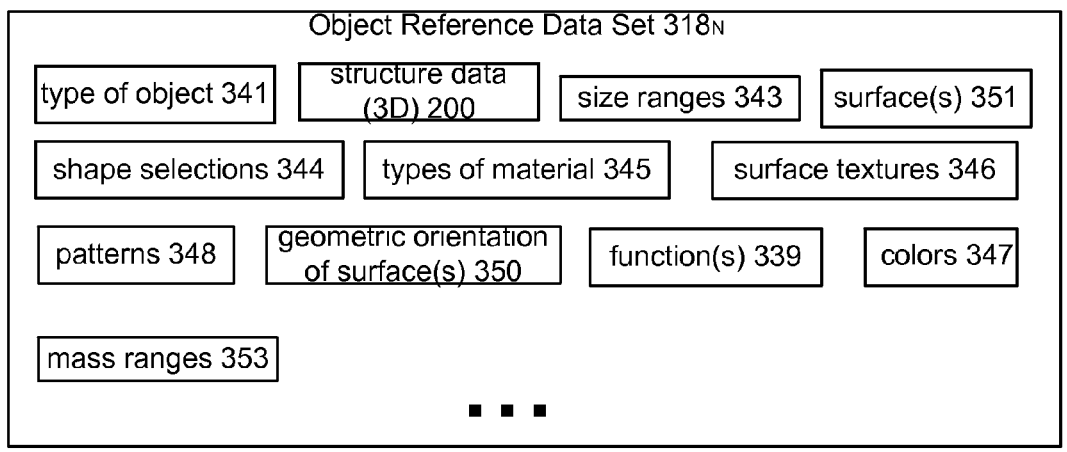
FIG. 3B illustrates an example of an object reference data set.

FIG. 3B illustrates an example of an object reference data set 318N with some examples of data fields which the data set may include. The object reference data sets 318 available to the object recognition engine 192 may have been predetermined manually offline by an application developer or by pattern recognition software and stored. Additionally, if a user selects an object by viewing it with the personal A/V apparatus 8 and inputting data for the data fields, an object reference data set is generated. Also, object reference data sets can be created and stored for sharing with other users as indicated in share permissions. Over time as the library or database of object reference data sets 318 grows, objects are recognized more quickly.

The data fields described below are representative examples and are not intended to be all inclusive. Furthermore, there may be a data set for a general type of object, like chair or car, and then data sets for specific types of chairs or cars. For example, a data set may include a base class object of chair and then sub-classes of chaise-lounge, folding chair, etc. with additional data fields for describing additional features specific to the sub-class. The illustrated data fields include a type of object 341 which may be a data record which also includes sub-fields. For the type of object 341, the other data fields provide data records identifying the types of physical properties available for the type of object. As discussed above, the data set also includes structure data 200 which is three dimensional in this example. The other examples of data records include size ranges 343, shape selections available 344, typical types of material 345, colors available 347, patterns available 348, surface(s) available 351, typical surface texture(s) 346, mass ranges 353, and a geometric orientation 350 of each available surface 351. Additionally, one or more functions 339 may be stored for an object reference data set $318_N$. For example, a cut function may be associated with scissors or a knife.

Figure 3C:
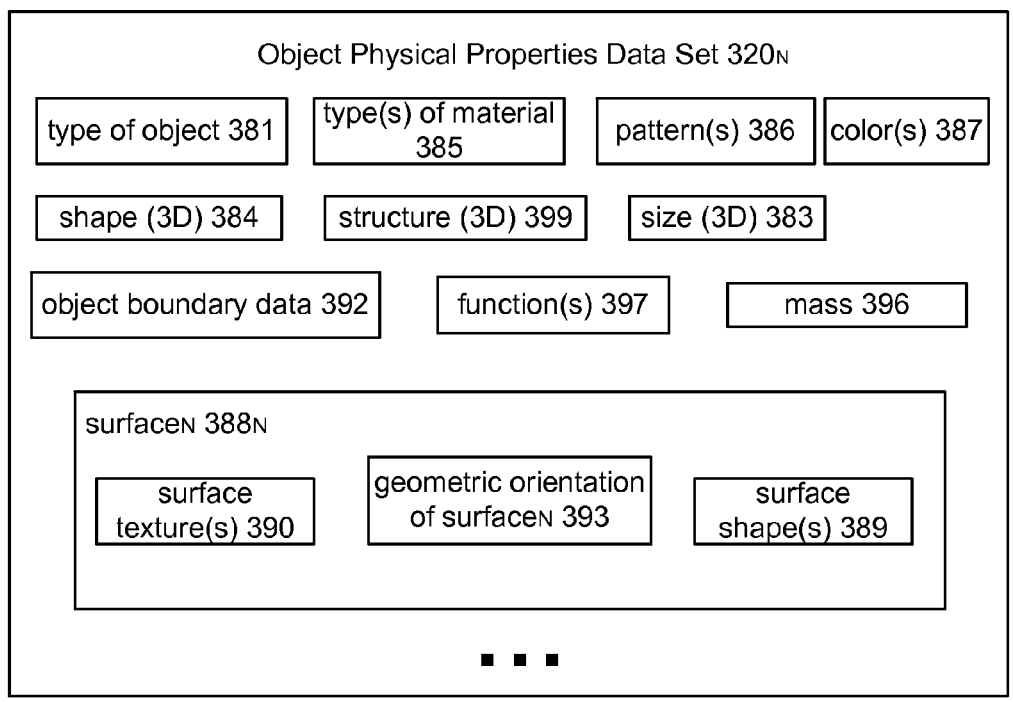
FIG. 3C illustrates some examples of data fields in an object physical properties data set.

FIG. 3C illustrates some examples of data fields in an object physical properties data set 320N stored for a real object, which includes data values detected or otherwise determined based on captured data of the real object, or for a specific virtual object. The example data fields include a type of object 381, size 383, in three dimensions in this example, shape 384, also 3D in this example, structure 399 (e.g. skeletal or for an inanimate object), also in three dimensions in this example, object boundary data 392, such as for example the determined edge data or a polygon mesh for a real object or the boundary data of a virtual object, type(s) of material 385, mass 396. For a real object, a type of surface material may be determined based on captured image data, and the types of inner material determined based on an object reference data set $318_N$ or other object reference data source like 197, 322, 324, and 326. Some other exemplary data fields include pattern(s) 386 and colors 387 as well as surface(s) $388_N$.

Surface 388N represents an exemplary data set for each surface identified. The data set includes one or more surface textures 390, a geometric orientation 393 of the surfaceN, and a surface shape 389 (e.g. flat, round, curvy, uneven, etc.).

For real objects, data is assigned to each of these data fields based on a weighted probability by the object recognition engine 192 as it detects object boundary data and colors and derives shapes and surfaces and looks up object reference data. These different properties are then weighted, and a probability is assigned whether an object in the image data is a certain type of object, and if the probability satisfies a criteria for a certain type of object, that type of object is assigned as the type of object 381 The object physical properties data set 320N is then stored in one or more network accessible data stores 320. In this example, one or more functions 339 from the object reference data set $318_N$ are stored as functions 397 for the specific object as well.

Figure 3D:
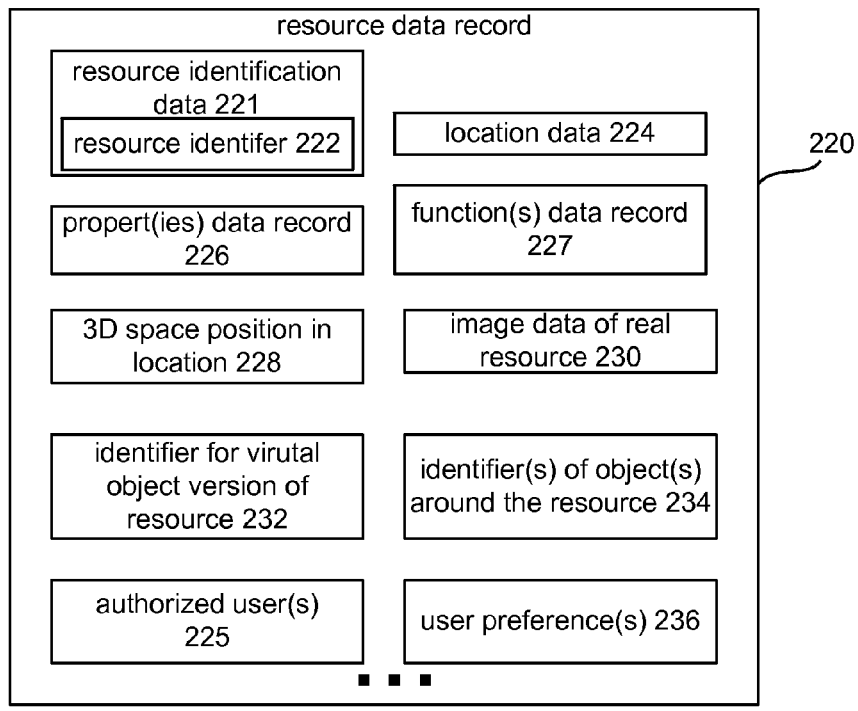
FIG. 3D is a block diagram illustrating an example of a resource data record.

FIG. 3D is a block diagram illustrating an example of a resource data record. In this example, the resource data record identifies a specific resource, for example an individual box of a certain type of cereal rather than the type of cereal as a whole. In this example, a resource data record 220 stores resource identification data 221 for identifying the resource, location data 224 identifying a location in which the resource is identified, and a 3D space position 228 in the identified location typically in reference to a 3D coordinate system for the location. The resource identification data 221 may identify a memory location for the object properties data set $320_N$ for the resource as well as information such as its manufacturer, producer, make, model, country of origin, price paid, date of purchase and other product information tracked for the type of object in accordance with regulation or trade practice. The resource identification data 221 also includes a resource identifier 222 which can be used for accessing the resource data record 220 and information in other data stores for the specific instance of the resource represented. In some instances, the resource identification data can include a uniform product code which identifies a specific instance of the product.

In some embodiments, a network accessible resource monitoring module 302 executing on a network accessible computer system 12 receives location data 224 updates for the resource from one or more personal A/V apparatus 8 which send the location data image data of the resource in the identified location. The resource monitoring application 188 may indicate a time frame in which to send the location data after identifying the resource in image data. The network accessible module 302 may control a network accessible copy of the resource data record 220 which is linked to resource profiles 329 associated with individual users in their user profile data 322. The network accessible module 302 may determine most current data for the resource based on the time of receipt and a time of capture indicated for the received location data. The network accessible resource monitoring module 302 can broadcast changes as they occur to the resource data record 220 including location data changes to client copies of the resource management application 188 executing on personal A/V apparatus of the users associated with the resource data record. Alternatively, the personal A/V apparatus 8 can download the latest version of the resource data record in accordance with notification criteria 305.

A data record 226 identifying one or more properties of the resource is included. Some examples of properties are a quantity, an expiration date, a physical damage indicator, a quality control indicator, warranty information, and a nutritional value. The resource management application 188 may assign default categories of properties to record based on the type of resource. In some examples, data for the properties can be determined based on text or symbols detected in image data of the resource and used as a search query. For example, a Uniform Product Code may be identified and used as a search query for a manufacturer's website to obtain information like nutrition values and warranty information. Other properties may be identified from image data like text indicating an expiration data and quantity. For example, quantity changes may be determined based on criteria stored for the quantity property in the properties data record 226 like proportional changes of colors associated with the object. Other criteria may be based on monitoring the transfer of one or more portions of the resource based on image data. A quality control indicator may be assigned different values by the resource management application 188 based on criteria like appearance of a certain color indicating a change in condition or a change in a surface texture associated with a resource. For example, the appearance of blue or green may indicate mold in dairy products, and a quality indicator may be indicated visually with a green circle displayed in image data around the real resource object when in a display field of view of the near-eye, AR display or around a virtual object version of the resource when notification criteria has been triggered. For example, a son's personal A/V apparatus detects a moldy yogurt in his image data, but his mother receives a visual message of the green circle around the image data of the moldy yogurt. A lumpy appearance to milk inside a carton indicates it is sour, and its quality indicator is updated to reflect that. A physical damage indicator may be updated based on shape changes to a container like broken glass or an indentation in a cylindrical can shape.

Image data of the resource 230 or a memory location for accessing the image data of the resource 230 is also stored. In this example, an identifier 232 for accessing a virtual object version of the resource is also stored. For assistance in locating the resource for a user, particularly when a view of the resource is at least partially blocked, one or more identifiers 234 of one or more objects around the resource may be stored as well. The one or more identifiers 234 may be resource identifiers for accessing resource data records. In this example, one or more authorized users 225 may be identified for the resource. Furthermore, an owner of the resource may be identified in the authorized user data, and that person can assign different levels of access to other users designated as authorized with respect to the resource itself as well as with respect to data stored in its resource data record. Users may be authorized based on a function of the resource. Notification criteria 305 may be stored which provides rules for notifying a user when an unauthorized use or relocation of the resource has occurred and for gathering identification data for the unauthorized user. An example of identification data is voice data identified by the sound recognition engine 194 during image or audio data capture of the unauthorized use or an IP address of the personal A/V apparatus 8 which has uploaded image data of the unauthorized use.

Also, in this example, one or more functions may be stored for a resource in a function data record 227. Functions may be identified and stored responsive to explicit user input. The resource management application 188 may also automatically identify one or more functions for the resource. In some examples, a manufacturer or retailer has registered a data store identifying functions for its products with the resource management application 188. Responsive to a product being identified as a resource, the application accesses the registered data store. In other examples, the resource management application 188 may assign one or more functions assigned to another object sharing a same type of object 381 as the resource. For example, a resource data record 220 may be being generated and another resource data record for another type of knife has already been generated and a cut function assigned to it in accordance with a manufacturer data store. The cut function is also assigned to the new resource data record 220 for the knife being added as a resource. In some examples, one or more functions 339 may have been stored in an object reference data set $318_N$ as in FIG. 3B which one or more functions 397 are also in turn assigned to the object physical properties data set 320N generated for the resource.

In this example, one or more user preference(s) 236 may be associated with a resource in the resource data record 220. For example, family members in the same household may be authorized users 225 with access to user preferences 236 identified and stored for different household members. For example, a user's dislike of a certain brand of pasta may be noted in the user preferences 236 of a resource data record 220 for a specific box of that brand of pasta.

Figure 3E:
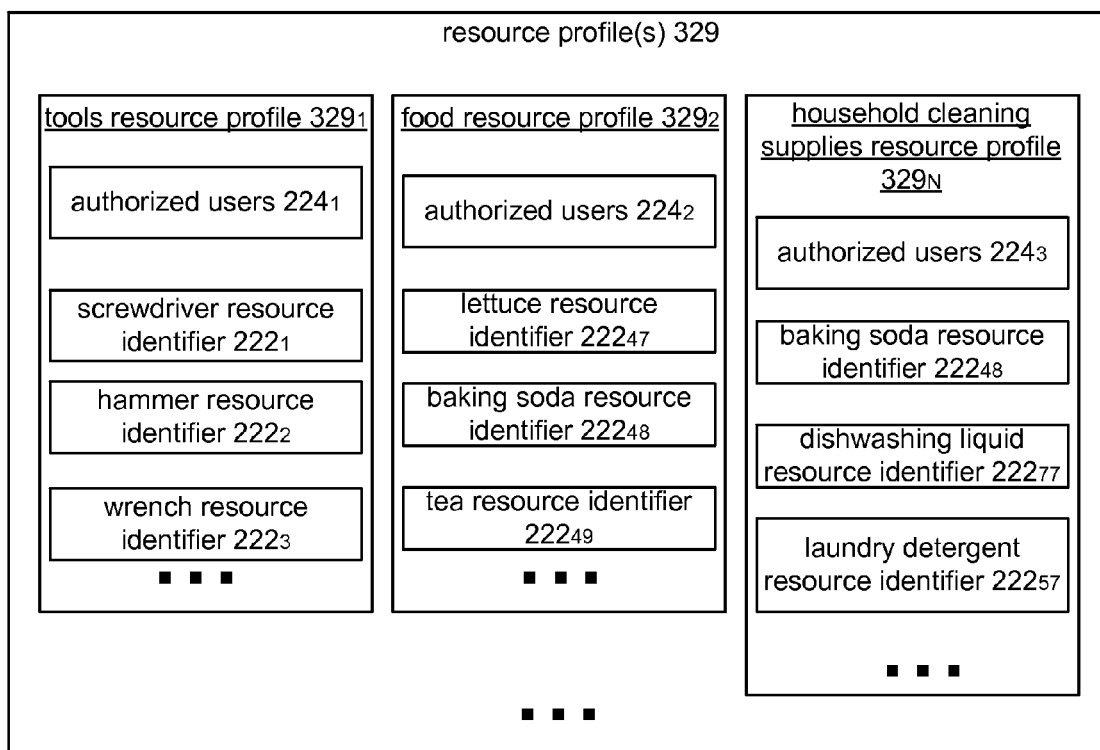
FIG. 3E is a block diagram illustrating some examples of resource profiles.

FIG. 3E is a block diagram illustrating some examples of resource profiles. The examples include a tools resource profile $329_1$, a food resource profile $329_2$ and a household cleaning supplies resource profile $329_N$. Identifiers such as names have been stored to identifier a respective set of authorized users $224_1$, $224_2$ and $224_3$ for each profile. Some examples of resources in each category of resource profile are provided. The tools resource profile includes as some examples a screwdriver resource identifier $222_1$, a hammer resource identifier $222_2$, and a wrench resource identifier $222_3$. The food resource profile includes as some examples a lettuce resource identifier $222_{47}$, a baking soda resource identifier $222_{48}$ and a tea resource identifier $222_{49}$. The household cleaning supplies resource profile includes as some examples the baking soda resource identifier $222_{48}$ as it is a resource with multiple purposes or functions, and the household cleaning supplies resource profile also includes a dishwashing liquid resource identifier $222_{77}$ and a laundry detergent resource identifier $222_{57}$.

An example of a supplemental information provider system 404 may be a software environment which provides resource management services to a plurality of users and which can access and aggregate data, as permitted by users, for updating information related to resources. For example, image data identifying different resources captured by different personal A/V apparatus 8 or other capture devices 20 can be stored along with any metadata in the reverse lookup resource image data 328.

Product manufacturers may also make image data of their products, which may include 3D virtual object models or versions of their products, stored in a standardized data format, like a holographic file format (see below) accessible to a cloud computing based resource management application 188 version executing on a supplemental information provider 404. The cloud based resource management application 188 can store the image data in the reverse lookup resource image data 328 and store and 3D virtual object versions in object reference data sets 318 for use in identifying resources. Stored image data or a 3D virtual object may not be available for some resources encountered in image data. As discussed further below, an object physical properties data set 320N can be stored for a detected object like a resource from which the virtual data engine 195 discussed below can generate and cause to be displayed a 3D virtual object version of a resource. The object physical properties data set 320N can be stored as an object reference data set 318N for use in identifying and tracking resources by the resource management application 188 which detected the resource as well as instances of the application 188 executing on other personal A/V apparatus 8 as well.

FIG. 4A is a block diagram of an embodiment of a supplemental information provider system 404 communicatively coupled via one or more communication networks 50 to a personal A/V apparatus 8 for providing information regarding one or more resources to a user of the personal A/V apparatus. A supplemental information provider system 404 may be implemented by one or more computer systems 12 executing a resource management application 188. One or more communication networks 50 can include wired and/or wireless networks, such as a LAN, WAN, WiFi, the Internet, an Intranet, cellular network etc. No specific type of network or communication means is designated. In some embodiments, supplemental information provider system 404 executing software such as the resource management application 188 is located locally to personal A/V apparatus 8 so that they communicate over a local area network, WiFi, Bluetooth or other short range communication means. In other embodiments, a supplemental information provider systems 404 is located remotely from personal A/V apparatus 8 so that they communication over the Internet, cellular network or other longer range communication means.

FIG. 4B shows an example architecture for one or more processes and/or software running on a supplemental information provider system 404. Supplemental information provider system 404 may create and provide supplemental information or location data, or may provide services which transmit supplemental information or location data from third party resource data providers 418 (e.g. manufacturers, growers, distributors, etc.) to a user's personal A/V apparatus 8. Multiple supplemental information provider systems and third party resource data providers may be utilized with the present technology. A supplemental information provider system 404 includes data storage for supplemental information data related to one or more resources and their location 410, user location and tracking data generated by user location and tracking module 412, the resource management application 188 as an example of an information display application, and optionally an authorization component 416.

The supplemental information provider system 404 communicates with the image and audio data processing engine 191 as a platform in order for its resource management application 188 copy to interact with resource management applications 188 executing on personal A/V apparatus 8 as well as supporting other information display applications interacting with copies on personal A/V apparatus.

User location and tracking module 412 keeps track of various users which are utilizing the system. Users can be identified by user identifiers, location and other elements. An information display application 414 like the resource management application 188 allows customization of both the type of display information to be provided to users and the manner in which it is displayed. In some embodiments, the display processing occurs at the supplemental information provider system 404. In other embodiments, information is provided to personal A/V apparatus 8 so that personal A/V apparatus 8 determines which information to be displayed and where, within the display, the information is be located.

FIG. 4C shows another configuration embodiment in which supplemental information provider system 404 is located locally to personal A/V apparatus 8, and supplemental information provider system 404 is in communication with a Central Control and Information Server(s) 422 via one or more communication networks 50.

In one embodiment, the Central Control and Information Server(s) 422 provide central control and data storage for multiple supplemental information provider systems 404, 404a, 404b, . . . which are in communication with respective personal A/V apparatus 8, 8a, 8b, . . . . Each of the supplemental information provider systems 404, 404a, 404b, . . . are at different locations and able to connect to any personal A/V apparatus 8 that is within a geographic region of the respective supplemental information provider system. For example, a supplemental information provider 404 may be supporting resource management in a store location, and the central control and information server is a centralized server providing information to multiple stores in the store chain.

The technology may be embodied in other specific forms without departing from the spirit or essential characteristics thereof. Likewise, the particular naming and division of modules, routines, applications, features, attributes, methodologies and other aspects are not mandatory, and the mechanisms that implement the technology or its features may have different names, divisions and/or formats.

For illustrative purposes, the method embodiments below are described in the context of the system embodiments described above. However, the method embodiments are not limited to operating in the system embodiments described above and may be implemented in other system embodiments. Furthermore, the method embodiments are continuously performed while the display device is in operation and an applicable application is executing. A display typically has a display or frame rate which updates faster than the human eye can perceive, for example 30 frames a second.

Figure 5:
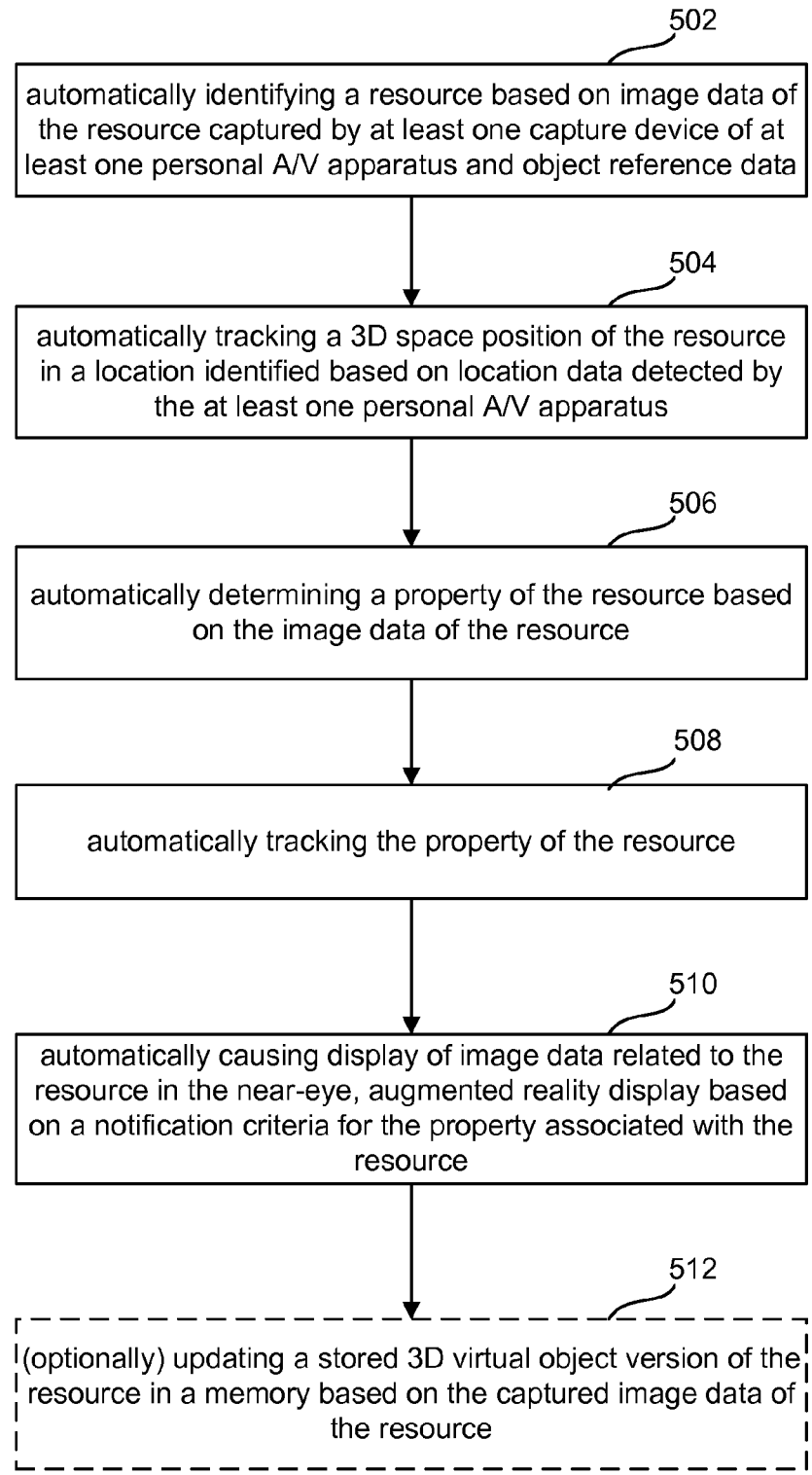
FIG. 5 is a flow chart describing an embodiment of a method for providing resource management using one or more personal audiovisual (A/V) apparatus including a near-eye, augmented reality (AR) display.

FIG. 5 is a flow chart describing an embodiment of a method for providing resource management using one or more personal audiovisual (A/V) apparatus including a near-eye, augmented reality (AR) display. In step 502, a resource is automatically identified based on image data of the resource captured by at least one capture device of at least one personal A/V apparatus and object reference data. For example, in the embodiment of FIG. 3A, the object recognition engine 192 can automatically identify the resource object and notify the resource management application 188. In step 504, a 3D space position of the resource in a location identified based on location data detected by the at least one personal A/V apparatus is automatically tracked. For example, the resource management application 188 can receive location data from the location sensing unit 144 for data like a GPS location or network access point for identifying, for example, whether the user is at home, work, a shopping center, or an outdoor location. With the current advances in GPS, a room a user is in can be identified. Additionally, image data can be location data as it can be matched with stored image data for identifying a location. The scene mapping engine 306 also provides updates of the 3D space position or position of a volume occupied by each object, real and virtual, in a 3D mapping of a location including a position of a resource object.

Furthermore, the location and 3D space position therein of a resource can be updated based on image data of the resource from another personal A/V apparatus 8 or another image capture device 20. The resource data record 220 may be associated with one or more resource profiles 329 stored in the cloud or updated based on the cloud copy. For example, a jar of peanut butter may be associated with a respective resource profile for each member of a family. The personal A/V apparatus 8a of the mother identifies her placement of the jar on a right side of a shelf in a kitchen cupboard. Later, a personal A/V apparatus 8b of her son captures image data of the jar being put on a different shelf in the cupboard. The change in location of the jar of peanut butter is updated in its resource data record 220. Later when the mother is looking for the peanut butter, her personal A/V apparatus accesses the resource data record for the peanut butter jar to receive its most current location which is the shelf where her son placed it. The resource data record 220 can be updated to a centralized copy of the resource management application 188 executing on a network accessible computer system 12 or directly by a personal A/V apparatus 8 of an authorized user.

In step 506, the resource management application 188 automatically determines a property of the resource based on the image data of the resource, and in step 508 automatically tracks the property of the resource. In step 510, the resource management application 188 can automatically cause display of image data related to the resource in the near-eye, augmented reality display based on a notification criteria for the property associated with the resource.

Optionally, in step 512, the resource management application 188 can have the virtual data engine 195 update a stored 3D virtual object version of the resource in a memory based on the captured image data of the resource. If a stored version does not yet exist, in some examples, the resource management application 188 may search data stores like accessible resource profiles 329 of other users and retailer or manufacturer Internet accessible data stores for an already generated 3D virtual object version of the resource to be used as a basis for updating in view of the object properties data set 320$_N$ stored for the resource by the object recognition engine 192. If none is found, the resource management application 188 can request the virtual data engine 195 to generate a virtual object version based on the object properties data set 320$_N$ detected in the captured image data and stored for the resource by the object recognition engine 192. The virtual object version may be stored in standard data format, e.g. a holographic file format in an accessible memory.

The current state of the resource can be captured each time the resource is identified in image data and a visual history updated over time. For example, time stamping of the image data can identify when damage occurred as indicated by a shape change. The virtual object may be a three dimensional (3D) virtual object. As illustrated in the example of FIG. 3D, an identifier 232 for accessing the virtual object version of the resource can be stored in a resource data record 220 for the resource.

Figures 6A, 6B:
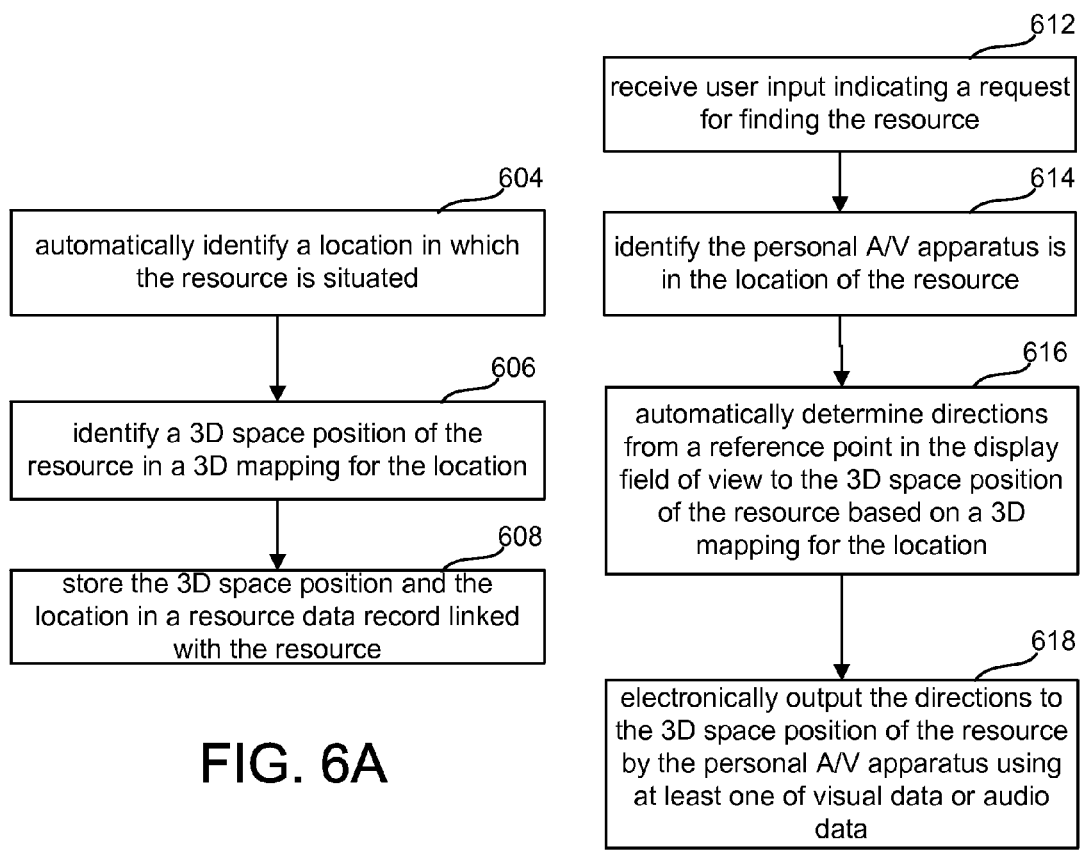
FIG. 6A is a flow chart describing an embodiment of a method for automatically tracking a location of the resource based on location data determined by the at least one personal A/V apparatus.
FIG. 6B is a flow chart describing an embodiment of a method for identifying a resource in a same location as a personal A/V apparatus.

FIG. 6A is a flow chart describing an embodiment of a method for automatically tracking a 3D space position of the resource in a location identified based on location data determined by the at least one personal A/V apparatus. In this embodiment, when a resource is identified in image data, for example by the object recognition engine 192, the resource management application 188 automatically identifies in step 604 a location in which the resource is situated, for example based on device data 198 from which location can be determined or the scene mapping engine 306 can identify the location as well based on image data and location sensing unit data In step 606, the scene mapping engine 306 identifies a 3D space position of the resource in a 3D mapping for the location which is communicated to the resource management application 188 which, in step 608, stores the 3D space position and the location in a resource data record 220 stored in a memory and linked with the resource.

FIG. 6B is a flow chart describing an embodiment of a method for identifying a resource in a same location as a personal A/V apparatus. In step 612, the resource management application 188 receives user input indicating a request for finding a resource and in step 614, identifies the personal A/V apparatus is in the location of the resource. In step 616, the resource management application 188 automatically determines directions from a reference point in the display field of view of the near-eye AR display to the 3D space position of the resource based on a 3D mapping for the location. In step 618, the resource management application 188 causes the directions to the 3D space position of the resource to be electronically output by the personal A/V apparatus using at least one of visual data or audio data. An example of a reference point may be an object which is a current point of gaze or a stationary structure in the field of view like a piece of furniture or an appliance.

Figure 6C:
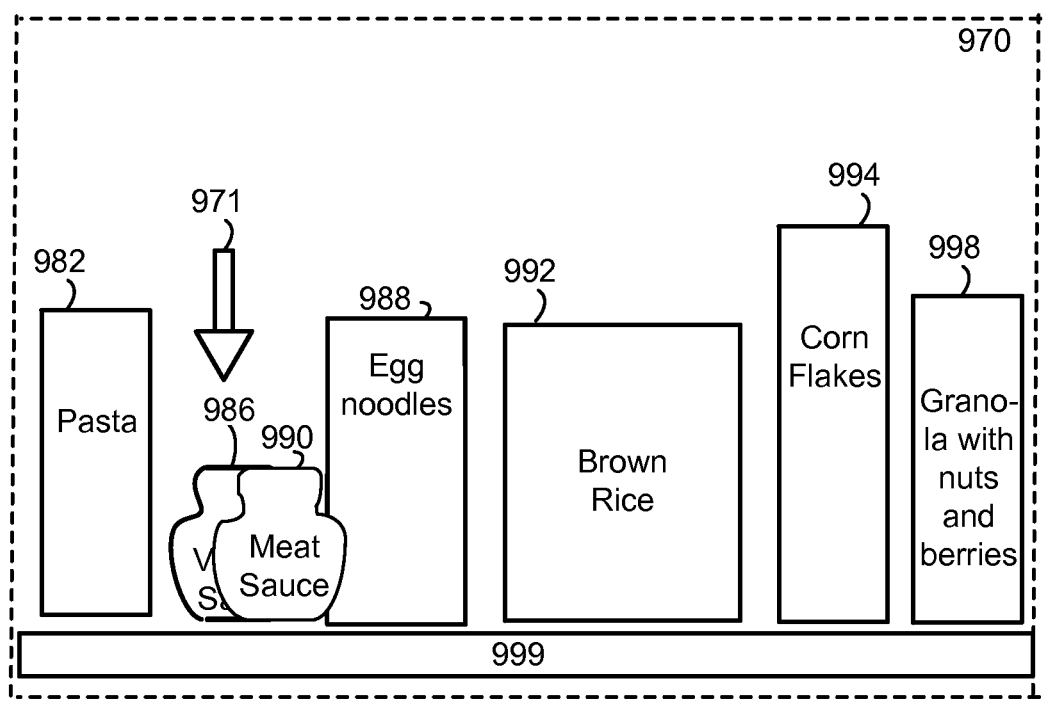
FIG. 6C provides an example of displaying visual data for identifying a resource in a display field of view.

FIG. 6C provides an example of displaying visual data for identifying a resource in a display field of view. An exemplary food storage location of a shelf 999 in a cabinet 970 includes pasta 982, non-meat tomato sauce 986, egg noodles 988, meat sauce 990, brown rice 992, Corn Flakes® cereal 994 and granola with nuts and berries 998. Visual data of image data of an arrow 971 is displayed to aid the user in finding the vegetarian or non-meat tomato sauce 986 behind the meat sauce 990.

Figure 6D:
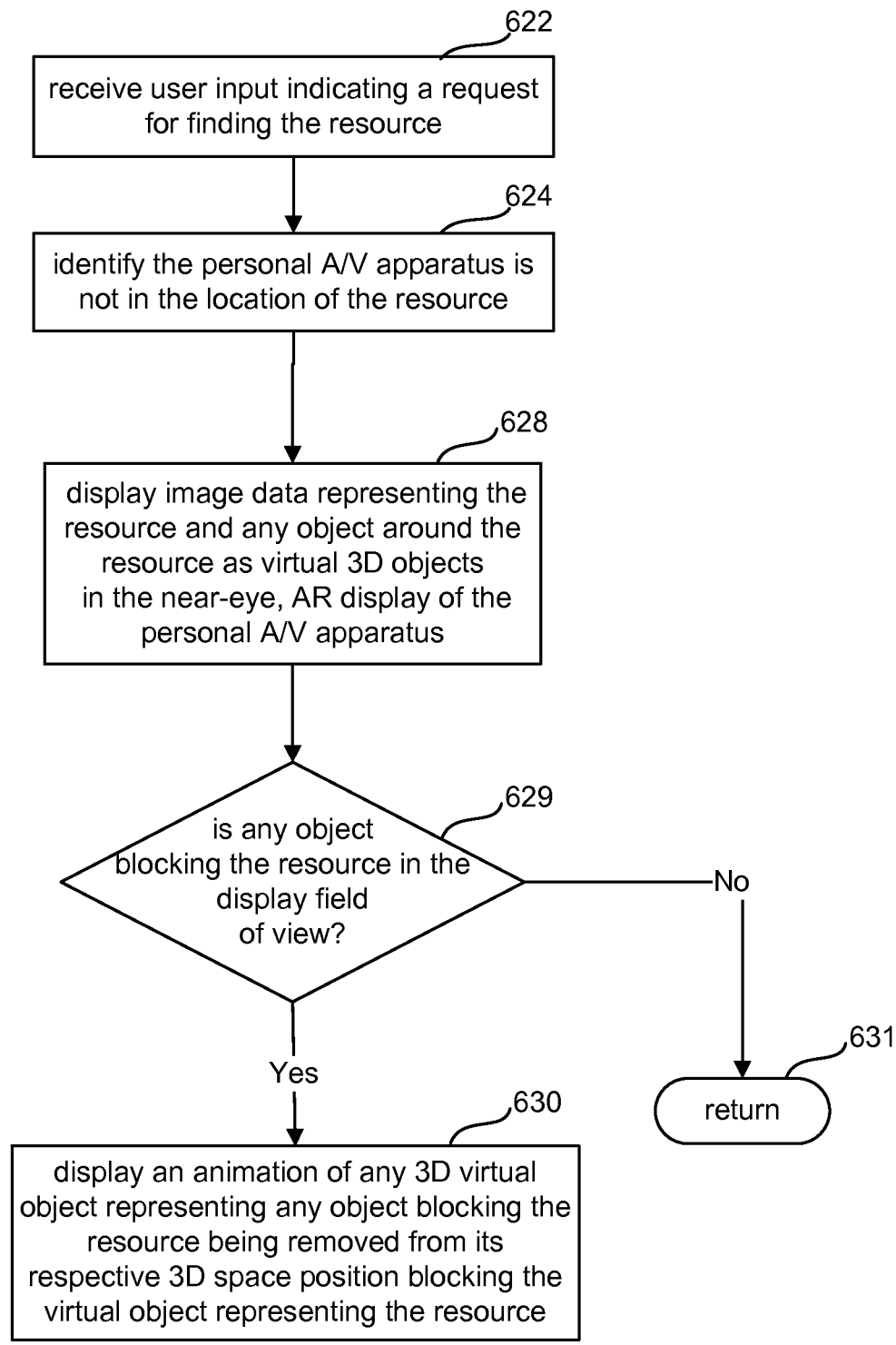
FIG. 6D is a flow chart describing an embodiment of a method for displaying 3D virtual data by a near-eye, augmented reality display of the personal A/V apparatus identifying a resource position in a location.

FIG. 6D is a flow chart describing an embodiment of a method for displaying 3D virtual data by a near-eye, augmented reality display of the personal A/V apparatus identifying a resource position in a location. This embodiment can assist a remote user in looking up a resource remotely, for example, when trying to assist another user find something neither remembers the name of. For example, a remote user may want to see a version of the tomato sauce jar which is on a shelf at home while she is shopping. In step 622, the resource management application 188 receives user input indicating a request for finding the resource, and identifies in step 624 that the personal A/V apparatus is not in the location of the resource. In step 628, the resource management application 188 causes the virtual data engine 195 to display image data representing the resource and any object around the resource as virtual 3D objects in the near-eye, AR display of the personal A/V apparatus. The image data may be based on the last display field of view of image data capturing the resource. In step 629, the resource management application 188 determines whether any object is blocking the resource in a display field of view. If not, in step 631, the resource management application 188 returns to other processing tasks. If there is a blocking object, in step 630, the resource management application 188 causes the virtual data engine 195 to display an animation of any 3D virtual object representing any object blocking the resource being removed from its respective 3D space position blocking the virtual object representing the resource.

In other embodiments, steps 628 through 630 may also be performed when the user is in the same location as the resource and even if the 3D space position of the resource is within the display field of view of the near-eye AR display of the user's personal A/V apparatus. The animation may be useful for finding blocked resources generally. For example, when a tool the user is trying to find is at the bottom of the tool chest, an animation removing virtual versions of the objects blocking it may assist a user in finding the tool more quickly. The tracking of the location of the object may also include identifying over time objects positioned around the resource and storing identifiers 234 for the objects in the resource data record 220 for the resource.

Responsive to natural user interface input indicating a user action to handle or manipulate the a virtual object in the display field of view, for example the resource, the virtual data engine 195 updates the image data of the virtual object to move in accordance with the user action.

Figure 7:
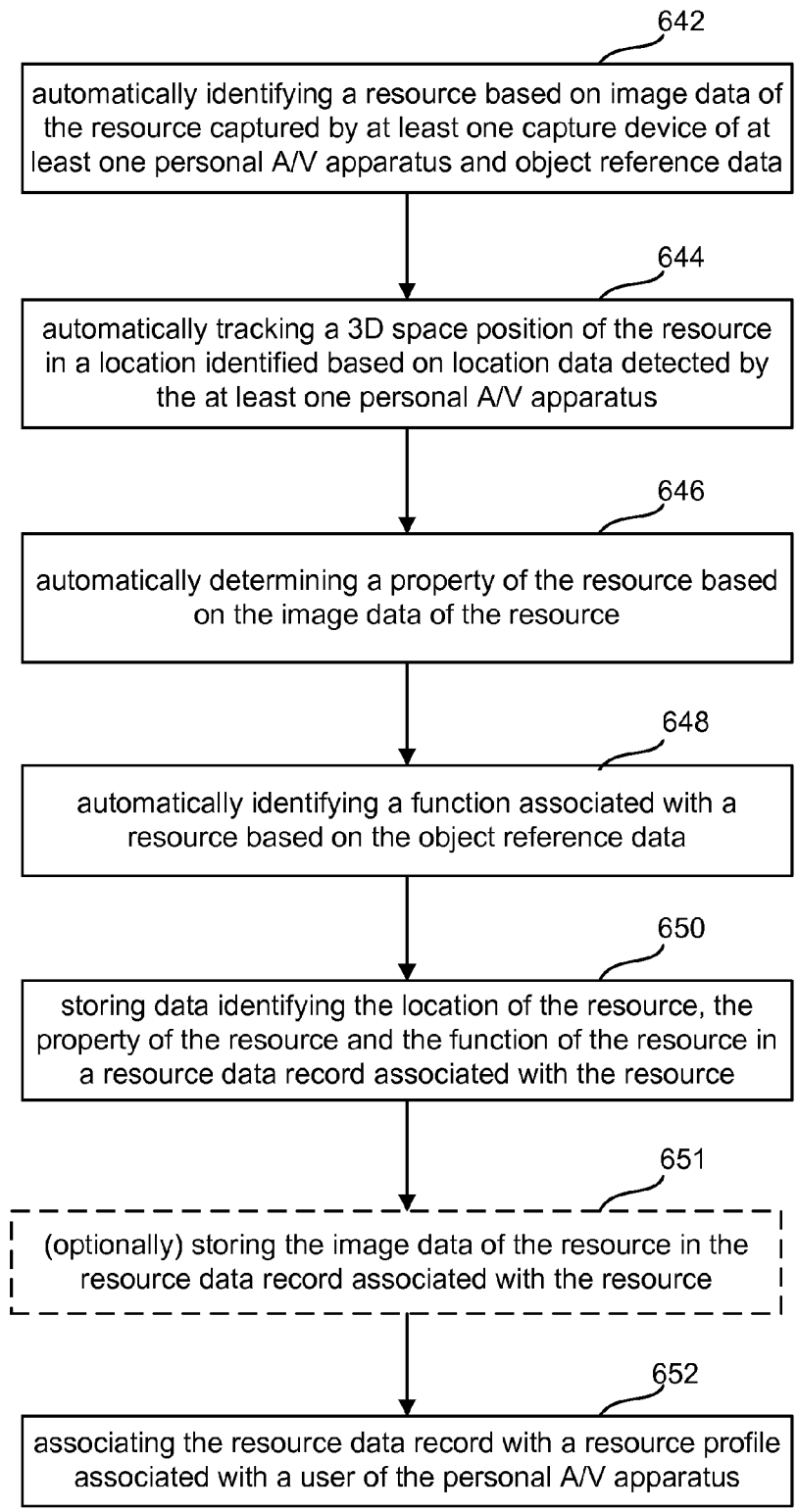
FIG. 7 is a flow chart describing another embodiment of a method for providing resource management using one or more personal audiovisual (A/V) apparatus including a near-eye, augmented reality (AR) display.

FIG. 7 is a flow chart describing another embodiment of a method for providing resource management using one or more personal audiovisual (A/V) apparatus including a near-eye, augmented reality (AR) display. In step 642, a resource is automatically identified based on image data of the resource captured by at least one capture device of at least one personal A/V apparatus and object reference data. In step 644, a 3D space position of a resource in a location identified based on location data detected by the at least one personal A/V apparatus is automatically tracked. In step 646, the resource management application 188 automatically determines a property of the resource based on the image data of the resource, and in step 648, automatically identifies a function associated with a resource based on object reference data 325. In step 650, the resource management application 188 stores data identifying the location of the resource, the property of the resource and the function of the resource in a resource data record 220 associated with the resource. Optionally, in step 651, the resource management application 188 stores the image data of the resource in the resource data record associated with the resource. In step 652 the resource data record is associated with a resource profile associated with a user of the personal A/V apparatus.

A location, property and function identified and stored by the resource management application 188 for the resource form bases upon which one or more tasks related to the resource can determine actions to take and data to output by the personal A/V apparatus 8. An example of a task is automatically updating a shopping list of a user associated with the personal A/V apparatus based on automatically tracking the property of the resource based on the image data of the resource. Some examples of a property which may be tracked for updating the shopping list include a quantity, an expiration date, a quality control indicator or a physical damage indicator.

Figure 8A:
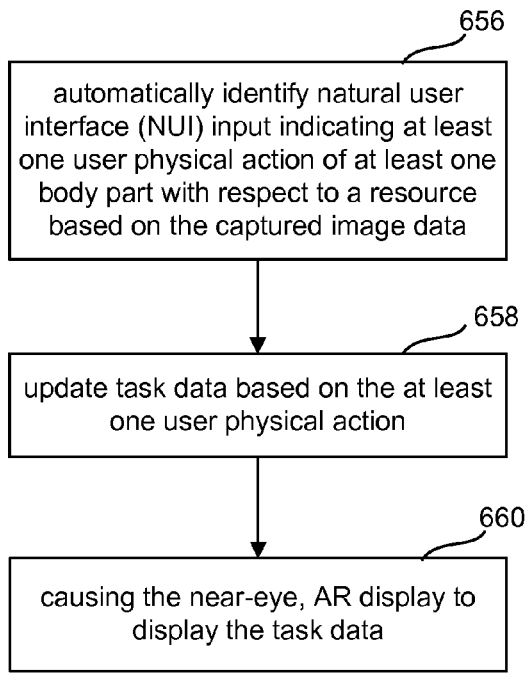
FIG. 8A is a flow chart describing an embodiment of a method for performing a task by a personal A/V apparatus based on detected user physical action with respect to one or more resources.

FIG. 8A is a flow chart describing an embodiment of a method for performing a task by a personal A/V apparatus based on detected user physical action with respect to one or more resources. In step 656, the one or more software and hardware components making up a natural user interface (NUI) automatically identify NUI input indicating at least one physical action of at least one body part with respect to a resource based on the captured image data, and in some embodiments, captured depth data. An example of one or more physical actions of at least one body part with respect to a resource is a gesture of placing a resource in a shopping cart. Such a gesture may be registered by a task budgeting module or a calorie counting task module in the case of food resources. Some other examples of user physical actions of at least one body part with respect to the resource which may be automatically identified are a first gesture of directing a holder of a resource into a predetermined space relative to the front of the near-eye, AR display in a direction approximating an intersection with an approximated position of a mouth of a user wearing the near-eye, AR display device 2 and exiting the space while maintaining the direction and a later second gesture of the holder re-appearing in the image data in the space but moving in a direction away from the approximated position of the mouth of the user with at least one of a reduction in size of the resource or a disappearance of the resource. Some examples of a holder are a hand, one or more fingers and a utensil under control of a hand. These last two gesture examples may be used for task modules like an eating monitoring application or a medicine usage monitoring application.

In step 658, the resource management application 188 updates task data based on the at least one user physical action, and in step 660 causes the virtual data engine 195 to display the task data on the near-eye, AR display 14. For example, in the case of the budgeting application, some examples of the task data displayed may be a cost of the resource registered to the real resource object in the display field of view, a budget amount and perhaps a sub-total. Additionally, the budgeting application may generate a purchase list with item descriptions and prices which is updated as the user shops. The personal A/V apparatus 8 can register with a resource management application 188 executing on a supplemental information provider 404 in the store for accessing object reference data 325 accessible by the supplemental information provider 404 via its resource data providers 418. Furthermore, during checkout, the resource management application 188 executing on the personal A/V apparatus 8 can request the purchase data identifying the items purchased according to the store's supplemental information provider 404 system. Upon receiving the purchase data, the resource management application 188 can compare its purchase list with the store's purchase data, and display task data indicating whether or not there are discrepancies. In the eating monitoring application, some examples of the task data which may be displayed may be a nutritional value like a calorie count associated with a food resource identified as consumed.

Another example of a kind of task is one that uses resources such as making a recipe or assembling furniture. Before pursuing such a task, it is useful to know if the resources for implementing the task are on hand. Additionally, a resulting object which can be produced or a type of task which can be performed can be identified based on resources identified as being on hand, or in other words available in a location of the user of the personal A/V apparatus 8.

Figure 8B:
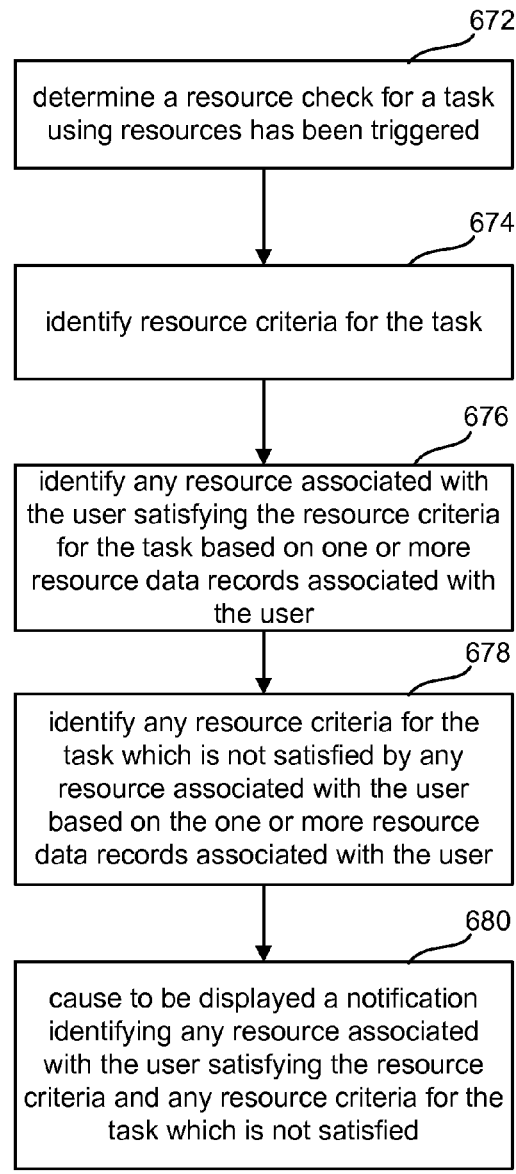
FIG. 8B is a flow chart describing an embodiment of a method for identifying one or more resources which satisfy resource criteria for implementing a task.

FIG. 8B is a flow chart describing an embodiment of a method for identifying one or more resources which satisfy resource criteria for implementing a task. In step 672, the resource management application 188 determines a resource check for a task using resources has been triggered. An example of a basis for determining a resource check for a task has been triggered is detecting NUI input indicating user selection of an object or an object of interest. For example, a piece of furniture at a furniture store location is identified as an object of gaze for a wearer of a personal A/V apparatus 8 by the eye tracking software 196 based on data from the eye tracking system 134 and a 3D mapping of the display field of view. User input such as speech may be parsed by the speech recognition software 194 for words indicating a query about a task associated with the object. The resource management application 188 may communicate a request including image data of the piece of furniture or an identifier for the piece of furniture identified from image data, for example a mobile tag or a uniform product code, with a supplemental information provider 404 computer system accessible via a network for information on the task with respect to the object. A resource data provider 418 for the furniture object may have uploaded data describing one or more tasks associated with the furniture resource like assembly, and the uploaded data identifies resources for completing the task.

In step 674, the resource management application 188 identifies resource criteria for the task. The resource criteria is a basis for determining whether a resource is usable for the task. Resource criteria may be determined by searching the text or images or audio of search result data returned from the query. Some examples of resource criteria include one or more identifiers of one or more resources, one or more types of objects, one or more resource properties or one or more functions to be performed in the task. In step 676, the resource management application 188 identifies any resource associated with the user satisfying the resource criteria for the task based on one or more resource data records associated with the user. Data from the resource data records 220 can be compared with the resource criteria for identifying one or more matches. In step 678, the resource management application 188 identifies any resource criteria for the task which is not satisfied by any resource associated the user based on the one or more resource data records associated with the user. In step 680, the resource management application 188 causes to be displayed a notification identifying any resource associated with the user satisfying the resource criteria and any resource criteria for the task which is not satisfied.

Figure 9:
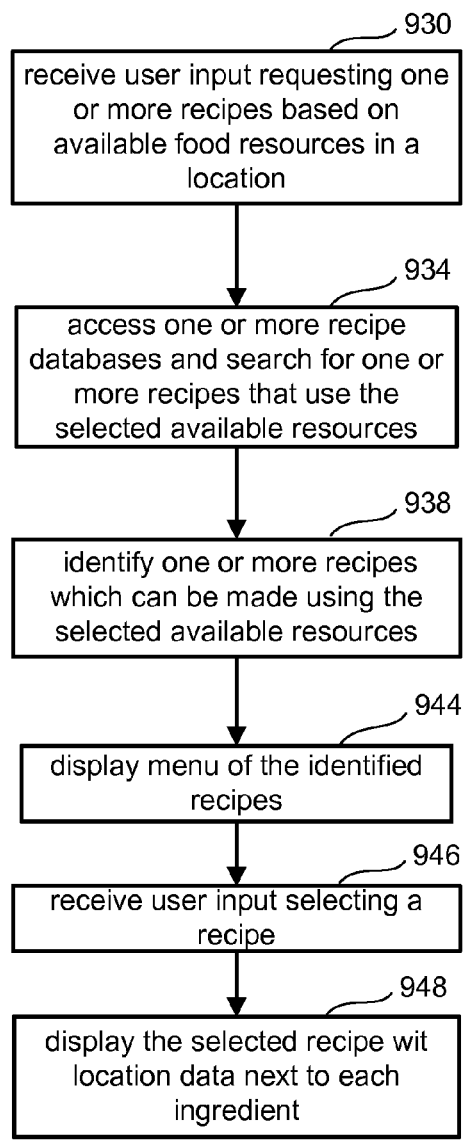
FIG. 9 is a flow chart describing one embodiment of a method for automatically identifying recipes using a personal A/V apparatus.

FIG. 9 is a flowchart describing one embodiment for automatically determining recipes that can be implemented using food items on hand. In step 930, the personal A/V apparatus 8 receives user input requesting one or more recipes based on available food resources in a location. The user input may be voice data saying something like "What can I make for dinner?" A task module for finding recipes may use the user's home as a default location and food resources available in the user's home as the bases for search queries for a recipe. Additional NUI input data may identify that the user has identified a set of food resources from those available to be used as a basis for identifying a recipe. Gaze duration data and hand or finger gestures may indicate one or more food resources selected. Voice data may also be processed by the speech recognition engine 194 for further clarification, for example a user statement: "What can I make with these?" while pointing to one, or a small number, of food items individually, such as by holding them in the hand or setting them aside on a counter can trigger the automatic identification of a recipe which uses those selected ingredients.

In step 934, the personal A/V apparatus will access one or more recipe databases, for example some accessible by a supplemental information provider system 404 or a Central Control and Information Server 422. Upon accessing the one or more databases of recipes, the resource management application 188 recipe task module will search for recipes that use the selected resources. In step 938, the recipe task module searches ingredients of recipe data and identifies one or more recipes which can be made using the selected available resources. In step 944, a menu of the identified one or more recipes are displayed in the near-eye, AR display of the personal A/V apparatus. In step 946, user input is received indicating user selection of a recipe from the menu. In step 948, the selected recipe is displayed on the near-eye, AR display with location data next to each ingredient.

Figure 10:
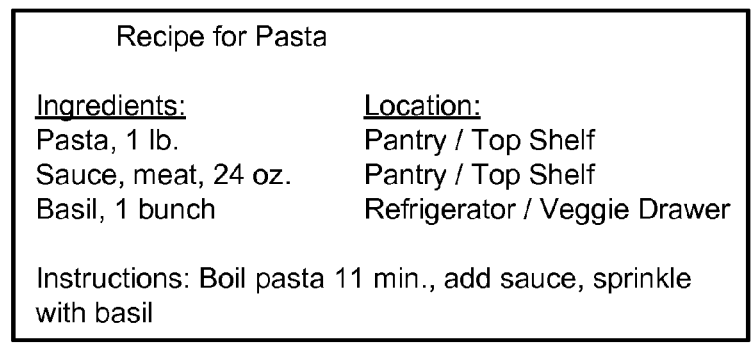
FIG. 10 provides an example of a recipe of a dish to be cooked based on resources available in a location.

FIG. 10 illustrates an example of image data displaying a selected recipe for pasta. For the ingredients of "Pasta, 1 lb." and "Sauce, meat, 24 oz.", a location of a top shelf of a pantry is identified. For "Basil, 1 bunch" a location of a veggie drawer of a refrigerator is identified. The instructions for the recipe are also displayed indicating how long to boil the pasta and to add the sauce and sprinkle with basil.

Many of the embodiments described herein include storing data about a user, objects and places. This data is then used to augment reality when looking through a personal A/V apparatus. To allow for the efficient storage of such data and exchange of such data, it is contemplated to have a predetermined standard format for storing that data. An example of such a format is referred to as a holographic file format. Use of a holographic file format will allow for portability of data between platforms, compressing the data, use of smart objects, and facilitating virtual representation of real world objects. For more information about some embodiments of a holographic file format, see U.S. patent application Ser. No. 13/430,972, Geisner et al., entitled "Personal Audio/Visual System with Holographic Objects," filed Mar. 27, 2012, which is hereby incorporated herein by reference.

FIG. 11 is a block diagram of one embodiment of a computing system that can be used to implement one or more network accessible computer systems 12 or a companion processing module 4 which may host at least some of the software components of computing environment 54 or other elements depicted in FIG. 3A. With reference to FIG. 11, an exemplary system includes a computing device, such as computing device 900. In its most basic configuration, computing device 900 typically includes one or more processing units 902 including one or more central processing units (CPU) and one or more graphics processing units (GPU). Computing device 900 also includes memory 904. Depending on the exact configuration and type of computing device, memory 904 may include volatile memory 905 (such as RAM), non-volatile memory 907 (such as ROM, flash memory, etc.) or some combination of the two. This most basic configuration is illustrated in FIG. 11 by dashed line 906. Additionally, device 900 may also have additional features/functionality. For example, device 900 may also include additional storage (removable and/or non-removable) including, but not limited to, magnetic or optical disks or tape. Such additional storage is illustrated in FIG. 11 by removable storage 908 and non-removable storage 910.

Device 900 may also contain communications connection(s) 912 such as one or more network interfaces and transceivers that allow the device to communicate with other devices. Device 900 may also have input device(s) 914 such as keyboard, mouse, pen, voice input device, touch input device, etc. Output device(s) 916 such as a display, speakers, printer, etc. may also be included. These devices are well known in the art so they are not discussed at length here.

The example computer systems illustrated in the figures include examples of computer readable storage devices. A computer readable storage device is also a processor readable storage device. Such devices may include volatile and nonvolatile, removable and non-removable memory devices implemented in any method or technology for storage of information such as computer readable instructions, data structures, program modules or other data. Some examples of processor or computer readable storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the information and which can be accessed by a computer.

Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A method for providing resource management using one or more personal audiovisual (A/V) apparatus including a near-eye, augmented reality (AR) display comprising:
    automatically identifying a resource based on image data of the resource captured by at least one capture device of at least one personal A/V apparatus and object reference data;
    automatically tracking a three dimensional (3D) space position of the resource in a location identified based on location data detected by the at least one personal A/V apparatus;
    automatically determining a property of the resource based on the image data of the resource;
    automatically tracking the property of the resource;
    automatically causing display of image data related to the resource in the near-eye, augmented reality display based on a notification criteria for the property associated with the resource;
    causing the near-eye, AR display to display discrepancy data of item descriptions and pricing information of a purchase list compared to store purchase data; and
    performing a task, wherein the task is an eating monitoring application, such that at least one user physical action of at least one body part with respect to the resource is automatically identified within an approximation to a mouth of a wearer of the near-eye, AR display, and the identified resource is determined to be moving to and from the mouth so as to recognize at least a reduction in an amount of the resource.

2. The method of claim 1 wherein the property associated with the resource comprises at least one of the following:
    a quantity;
    an expiration date;
    a physical damage indicator;
    a quality control indicator; and
    a nutritional value.

3. The method of claim 1 further comprising:
    generating and storing a three dimensional (3D) virtual object version of the resource in a memory based on the image data of the resource.

4. The method of claim 1 wherein automatically tracking the 3D space position of the resource in the location identified based on location data detected by the at least one personal A/V apparatus further comprises:
    automatically identifying the location in which the resource is situated;
    identifying a 3D space position of the resource in a three dimensional (3D) mapping for the location; and
    storing the 3D space position and the location in a resource data record linked with the resource in a memory.

5. The method of claim 4 further comprising:
    receiving user input indicating a request for finding the resource;
    identifying the personal A/V apparatus is in the location of the resource;
    automatically determining directions from a reference point in a display field of view to the 3D space position of the resource based on the 3D mapping for the location; and
    electronically outputting the directions to the 3D space position of the resource by the personal A/V apparatus using at least one of visual data or audio data.

6. The method of claim 4 further comprising:
    receiving user input indicating a request for finding the resource;
    identifying the personal A/V apparatus is not in the location;
    displaying image data representing the resource and any object around the resource as virtual 3D objects in the near-eye, AR display of the personal A/V apparatus; and
    responsive to any object blocking the resource in the display field of view, displaying an animation of any 3D virtual object representing any object blocking the resource being removed from its respective 3D space position blocking the virtual object representing the resource.

7. The method of claim 1 further comprising performing a task which further comprises:
    automatically identifying natural user interface (NUI) input indicating at least one user physical action of at least one body part with respect to the resource based on the image data captured by the at least one capture device of the at least one personal A/V apparatus;
    updating the task data based on the at least one user physical action.

8. The method of claim 7 wherein the task is a budgeting application and automatically identifying the NUI input indicating at least one user physical action of at least one body part with respect to the resource further comprises automatically identifying a gesture of placing the resource in a shopping cart; and
    causing the near-eye, augmented reality display to display the task data further comprises causing the near-eye, augmented reality display to display data identifying a cost of the resource and a budget amount.

9. The method of claim 7 wherein the resource is a food resource and automatically identifying the NUI input indicating at least one user physical action of at least one body part with respect to the resource further comprises:
    automatically identifying a first gesture of directing a holder of the food resource into a predetermined space relative to a front of the near-eye, AR display in a direction approximating an intersection with an approximated position of the mouth of the wearer wearing the near-eye, AR display and exiting the space while maintaining the direction;

automatically identifying a second gesture of the holder re-appearing in image data in the space moving in a direction away from the approximated position of the mouth of the wearer; and causing the near-eye, augmented reality display to display the task data further comprises causing the near-eye, augmented reality display to display data identifying a nutritional value associated with the food resource.

10. A personal audiovisual (A/V) apparatus including a near-eye, augmented reality display for providing resource management comprising:

the near-eye augmented reality display having a display field of view and being supported by a near-eye support structure;

one or more processors being communicatively coupled to the near-eye, augmented reality display for controlling the display;

the one or more processors being communicatively coupled to at least one capture device on the near-eye support structure for receiving image data captured by the at least one capture device of a location in which the support structure is situated;

the one or more processors automatically identifying a real object in the image data based on object reference data stored in an accessible memory;

the one or more processors identifying the real object as a resource falling within a category of a resource profile based on a type of object determined for the real object and associating a shared resource data record for the resource with the resource profile in data stored in a memory; and the one or more processors identifying and storing in the shared resource data record a three dimensional (3D) space position of the resource in the location based on the image data and a 3D mapping of the location, and automatically tracking a change in the 3D space position of the resource and position of a volume of the resource in the location and updating the shared resource data record to identify the location in which the resource is located and the position of a volume occupied by the resource;

the one or more processors identifying a sought after identified resource selected by a user; and the one or more processors being responsive to any object blocking the selected sought after resource in the display field of view, cause an automatic displaying of visual data of an indicator to identify a location of the selected sought after resource being blocked by the object.

11. The apparatus of claim 10 wherein the one or more processors identifying and storing in the resource data record a three dimensional (3D) space position of the resource in the location based on the image data and a 3D mapping of the location further comprises:

the one or more processors identifying and storing in the resource data record a three dimensional (3D) space position of the resource in the location based on depth data captured by the at least one capture device on the near-eye support structure.

12. The apparatus of claim 10 further comprising:

the one or more processors of the personal A/V apparatus associating one or more authorized users with the resource data record and storing notification criteria for notifying a user when at least one of the following occurs:

an unauthorized use of the resource, and
an unauthorized relocation of the resource.

13. The apparatus of claim 10 further comprising:

the one or more processors being communicatively coupled to a second personal A/V apparatus and updating the location and 3D space position of the resource in the location based on image data of the resource received from the second personal A/V apparatus.

14. The apparatus of claim 10 further comprising:

the one or more processors determining a function of the resource based on a function associated with a type of object of the resource in the accessible object reference data.

15. The apparatus of claim 14 further comprising:

the one or more processors being communicatively coupled to a network accessible computer system for accessing a network accessible copy of the resource data record; and the one or more processors identifying a state of a property for the resource based on the network accessible copy of the resource data record.

16. The apparatus of claim 10 further comprising:

a natural user interface comprising an eye tracking system being positioned by the near-eye support structure, and eye tracking software being executed by the one or more processors for identifying a user physical action of an eye based action based on eye data from the eye tracking system indicating selection of an object in the display field of view.

17. One or more processor readable storage devices comprising instructions which cause one or more processors to execute a method for providing resource management using one or more personal audiovisual (A/V) apparatus including a near-eye, augmented reality display, the method comprising:

automatically identifying a food resource based on image data of the food resource captured by at least one capture device of at least one personal A/V apparatus and object reference data;

automatically tracking a 3D space position of the food resource in a location identified based on location data detected by the at least one personal A/V apparatus;

automatically determining a property of the food resource based on the image data of the food resource;

automatically identifying a function associated with the food resource based on the object reference data;

storing data identifying the location of the food resource, the property of the food resource and the function associated with the food resource in a resource data record associated with the food resource, the location, property and function forming the basis upon which one or more tasks related to the food resource determine actions to perform and task data to output, the actions to perform based on a user of the near-eye augmented reality display identifying a set of food resources;

identifying one or more recipes to be made using the identified set of food resources;

automatically outputting the one or more recipes to the augmented reality display;

determining actions to perform based on the user of the near-eye augmented reality display identifying at least one of the one or more recipes;

storing the one or more selected recipes in the resource data record; and associating the resource data record with a resource profile associated with a user of the personal A/V apparatus.

18. The one or more processor readable storage devices of claim 17 wherein the method further comprises:
   storing image data of the resource in the resource data record associated with the resource.

19. The one or more processor readable storage devices of claim 17 further comprising:
   determining a resource check has been triggered for a task using resources;
   identifying resource criteria for the task;
   identifying any resource associated with the user satisfying the resource criteria for the task based on one or more resource data records associated with the user;
   identifying any resource criteria for the task which is not satisfied by any resource associated with the user based on the one or more resource data records associated with the user; and
   causing to be displayed a notification identifying any resource associated with the user satisfying the resource criteria and any resource criteria for the task which is not satisfied.

20. The one or more processor readable storage devices of claim 19 wherein the resource criteria for the task comprises at least one of the following:
   one or more functions to be performed by one or more resources;
   one or more properties of one or more resources; and one or more identifiers of one or more resources.

* * * * *